US008610686B1

(12) United States Patent
Peng et al.

(10) Patent No.: US 8,610,686 B1
(45) Date of Patent: *Dec. 17, 2013

(54) APPARATUS AND METHOD FOR RECOGNIZING A TAP GESTURE ON A TOUCH SENSING DEVICE

(75) Inventors: Tao Peng, Shanghai (CN); Zheng Qin, Shanghai (CN)

(73) Assignee: Cypress Semiconductor Corporation, San Jose, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 13/367,720

(22) Filed: Feb. 7, 2012

Related U.S. Application Data

(63) Continuation of application No. 11/395,674, filed on Mar. 30, 2006, now Pat. No. 8,111,243.

(51) Int. Cl.
*G06F 3/041* (2006.01)

(52) U.S. Cl.
USPC .......................................... 345/173; 345/178

(58) Field of Classification Search
USPC ................................ 345/156–178, 661, 863; 178/18.03–18.06; 704/272; 84/661, 10; 705/14.53; 382/107
See application file for complete search history.

(56) References Cited

U.S. PATENT DOCUMENTS 5,305,017 A 4/1994 Gerpheide
5,543,591 A 8/1996 Gillespie et al.
5,650,597 A * 7/1997 Redmayne ................ 178/18.06
5,736,978 A * 4/1998 Hasser et al. ................ 345/173
5,748,185 A 5/1998 Stephan et al.
5,875,257 A * 2/1999 Marrin et al. ................ 382/107
5,943,052 A 8/1999 Allen et al.
6,061,050 A * 5/2000 Allport et al. ................ 345/173
6,067,019 A 5/2000 Scott
6,168,391 B1 1/2001 Ono
6,343,519 B1 2/2002 Callicott et al.
6,380,931 B1 4/2002 Gillespie et al.
6,414,671 B1 7/2002 Gillespie et al.
6,424,338 B1 * 7/2002 Anderson ..................... 345/173
6,545,669 B1 * 4/2003 Kinawi et al. ................ 345/173
6,597,347 B1 7/2003 Yasutake
6,704,005 B2 3/2004 Kato et al.
6,825,890 B2 11/2004 Matsufusa
6,933,930 B2 8/2005 Devige et al.
7,006,080 B2 2/2006 Gettemy
7,030,860 B1 4/2006 Hsu et al.
7,039,123 B2 * 5/2006 Kokuryo et al. .............. 375/295
7,084,860 B1 8/2006 Jaeger et al.
7,084,933 B2 8/2006 Oh et al.
7,098,896 B2 * 8/2006 Kushler et al. ................ 345/168
7,333,090 B2 2/2008 Tanaka et al.
7,420,546 B2 9/2008 Abdallah et al.
7,489,297 B2 * 2/2009 Hohmann et al. ............ 345/158
7,538,268 B2 * 5/2009 Marcus ........................... 84/723
7,589,709 B2 9/2009 Liess et al.
7,705,830 B2 * 4/2010 Westerman et al. .......... 345/173

(Continued)

OTHER PUBLICATIONS

Chapweske, Adam; "The PS/2 Mouse Interface," PS/2 Mouse Interfacing, 2001, retrieved on May 16, 2006; 11 pages.

(Continued)

*Primary Examiner* — Prabodh M Dharia

(57) ABSTRACT

A method and apparatus detect a presence of a conductive relative to a capacitive sensing device, determine a velocity of the detected presence, and recognize a gesture based on the determined velocity.

25 Claims, 15 Drawing Sheets

(56) References Cited

U.S. PATENT DOCUMENTS

| | | | | |
|---|---|---|---|---|
| 7,706,920 | B2 * | 4/2010 | Wieland | 700/254 |
| 7,724,242 | B2 * | 5/2010 | Hillis et al. | 345/173 |
| 7,728,821 | B2 * | 6/2010 | Hillis et al. | 345/173 |
| RE42,038 | E | 1/2011 | Abdallah et al. | |
| 7,868,874 | B2 * | 1/2011 | Reynolds | 345/173 |
| 7,907,124 | B2 * | 3/2011 | Hillis et al. | 345/173 |
| 8,159,455 | B2 * | 4/2012 | Leung | 345/156 |
| 8,188,985 | B2 * | 5/2012 | Hillis et al. | 345/173 |
| 8,269,739 | B2 * | 9/2012 | Hillis et al. | 345/173 |
| 8,314,351 | B2 * | 11/2012 | Reynolds | 178/19.07 |
| 2002/0015064 | A1 * | 2/2002 | Robotham et al. | 345/863 |
| 2004/0007116 | A1 * | 1/2004 | Marcus | 84/10 |
| 2004/0017355 | A1 | 1/2004 | Shim | |
| 2004/0068409 | A1 | 4/2004 | Tanaka et al. | |
| 2004/0140956 | A1 * | 7/2004 | Kushler et al. | 345/168 |
| 2005/0120870 | A1 * | 6/2005 | Ludwig | 84/661 |
| 2005/0179648 | A1 * | 8/2005 | Barabe et al. | 345/156 |
| 2006/0066582 | A1 | 3/2006 | Lyon et al. | |
| 2006/0097991 | A1 | 5/2006 | Hotelling et al. | |
| 2006/0108349 | A1 | 5/2006 | Finley et al. | |
| 2006/0125803 | A1 * | 6/2006 | Westerman et al. | 345/173 |
| 2006/0152739 | A1 | 7/2006 | Silvestre | |
| 2006/0172767 | A1 | 8/2006 | Cathey et al. | |
| 2006/0187214 | A1 | 8/2006 | Gillespie et al. | |
| 2006/0227116 | A1 * | 10/2006 | Zotov et al. | 345/173 |
| 2006/0274042 | A1 | 12/2006 | Krah et al. | |
| 2006/0274046 | A1 * | 12/2006 | Hillis et al. | 345/173 |
| 2006/0279557 | A1 | 12/2006 | Gettemy | |
| 2007/0229469 | A1 | 10/2007 | Seguine | |
| 2007/0229470 | A1 | 10/2007 | Snyder et al. | |
| 2007/0236475 | A1 | 10/2007 | Wherry | |
| 2007/0247431 | A1 | 10/2007 | Skillman et al. | |
| 2007/0262962 | A1 | 11/2007 | Xiaoping et al. | |
| 2008/0211766 | A1 * | 9/2008 | Westerman et al. | 345/156 |
| 2010/0045705 | A1 * | 2/2010 | Vertegaal et al. | 345/661 |
| 2011/0057882 | A1 | 3/2011 | Zeng et al. | |
| 2011/0074732 | A1 * | 3/2011 | Reynolds | 345/174 |
| 2012/0215639 | A1 * | 8/2012 | Ramer et al. | 705/14.53 |

OTHER PUBLICATIONS

Cypress Semiconductor Corporation, "CY8C21x34 Data Sheet," CSR User Module, CSR V.1.0; Oct. 6, 2005; pages.

Dennis Seguine, "Capacitive Switch Scan," AN2233a, Application Note, CY8C21x34, Apr. 7, 2005; 6 pages.

Ryan Seguine et al, "Layout Guidelines for PSoC CapSense", Cypress Application Note AN2292, Revision B, Oct. 31, 2005; all pages.

USPTO Final Rejection for U.S. Appl. No. 11/395,674 dated Jun. 27, 2011; 19 pages.

USPTO Final Rejection for U.S. Appl. No. 11/395,674 dated Jul. 16, 2009; 12 pages.

USPTO Non-Final Rejection for U.S. Appl. No. 11/395,674 dated Jan. 19, 2011; 16 pages.

USPTO Non-Final Rejectio: for U.S. Appl. No. 11/395,674 dated Feb. 10, 2009; 10 pages.

USPTO Non-Final Rejection for U.S. Appl. No. 11/395,674 dated Apr. 19, 2010, 15 pages.

USPTO Non-Final Rejection for U.S. Appl. No. 11/395,674 dated Aug. 27, 2010; 15 pages.

USPTO Non-Final Rejecticao for U.S. Appl. No. 11/395,674 dated Nov. 18, 2009; 11 pages.

USPTO Notice of Allowance for U.S. Appl. No. 11/395,674 dated Nov. 14, 2011; 8 pages.

* cited by examiner

TOP-VIEW of 2-Layer Touch-Sensor Pad 220

CROSS-SECTIONAL VIEW of 2-Layer Touch-Sensor Pad 220

Intuitively, higher Q indicate a sharper peak.

APPARATUS AND METHOD FOR RECOGNIZING A TAP GESTURE ON A TOUCH SENSING DEVICE

RELATED APPLICATIONS

This application is a continuation application of U.S. application Ser. No. 11/395,674 filed Mar. 30, 2006, now U.S. Pat. No. 8,111,243, issued Feb. 7, 2012, which is incorporated herein by reference.

TECHNICAL FIELD

This invention relates to the field of user interface devices and, in particular, to touch-sensing devices.

BACKGROUND

Computing devices, such as notebook computers, personal data assistants (PDAs), and mobile handsets, have user interface devices, which are also known as human interface device (HID). One user interface device that has become more common is a touch-sensor pad. A basic notebook touch-sensor pad emulates the function of a personal computer (PC) mouse. A touch-sensor pad is typically embedded into a PC notebook for built-in portability. A touch-sensor pad replicates mouse x/y movement by using two defined axes which contain a collection of sensor elements that detect the position of a conductive object, such as finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a cursor, or selecting an item on a display. These touch-sensor pads can include multi-dimensional sensor arrays. The sensor array may be one dimensional, detecting movement in one axis. The sensor array may also be two dimensional, detecting movements in two axes.

FIG. 1A illustrates a conventional touch-sensor pad. The touch-sensor pad 100 includes a sensing surface 101 on which a conductive object may be used to position a cursor in the x- and y-axes. Touch-sensor pad 100 may also include two buttons, left and right buttons 102 and 103, respectively. These buttons are typically mechanical buttons, and operate much like a left and right button on a mouse. These buttons permit a user to select items on a display or send other commands to the computing device.

In addition to detecting motion of the conductive object in one or two axes to control cursor movement, these conventional touch-sensor pads have been designed to recognize gesture features. One conventional touch-sensor pad includes methods for recognizing gestures made by a conductive object on a touch-sensor pad, as taught by U.S. Pat. No. 6,380,931 to Gillespie et al. This conventional touch-sensor pad recognizes tapping, pushing, hopping, and zigzag gestures by analyzing the position, pressure, and movement of the conductive object on the sensor pad during the time of a suspected gesture, and sends signals to a host indicating the occurrence of these gestures.

This conventional touch-sensor pad includes a capacitive position sensing system, which determines the position of the conductive object, such as a finger, that is proximate to or touching a sensing surface. This conventional touch-sensor pad also obtains the finger pressure by summing the capacitances measured on sense lines. A finger is present if the pressure exceeds a suitable threshold value. The basic "tap" gesture is a quick tap of the finger on the pad. Such a tap, of short duration, involving little or no X or Y finger motion during the tap, is presented to the host as a brief click of the mouse button. If a multi-button mouse is simulated, the tap gesture may simulate a click of the "primary" mouse button, or the button to be simulated may be user-selectable using a shift key, control panel, or other known means. Two taps in rapid succession are presented to the host as a double click of the button. In general, multiple taps translate into multiple clicks.

In addition, because it is impossible to tell whether a finger stroke will be a valid tap while the finger is still down (as opposed to a cursor motion), this conventional touch-sensor pad, does not report a button click until the finger is lifted. This delay is not generally noticeable to the user since taps by definition are very brief strokes.

FIG. 1B illustrates a graph of the capacitance over time of the conventional touch-sensor pad described above. Graph 104 includes a pressure threshold, $Z_{tap}$ 109, and a threshold time, $T_{tap}$ 107. $Z_{tap}$ 109 is the minimum pressure to detect a tapping finger. $T_{tap}$ 107 is the maximum amount of time that the finger is in contact with the touch-sensor pad in order to qualify as a tap gesture. Line 105 illustrates the capacitance over time of finger as it comes into contact with the touch-sensor pad, and as the finger releases from the touch-sensor pad. Line 105 crosses the pressure threshold $Z_{tap}$ 109 in two cross-points, points 110 and 111. The time (T) 106 between the two cross-points 110 and 111 is less than the threshold time $T_{tap}$ 107, and accordingly, is recognized as a tap gesture. In other words, using this method, if the amount of time the conductive object is present on the touch-sensor pad (i.e., above the pressure threshold Ztap 109) is less than the reference amount of time, $T_{tap}$ 107, then a tap gesture will be recognized.

One problem with this conventional method for recognizing a tap gesture is that it requires measuring the time of the presence of the conductive object only above the minimum pressure threshold. This method could potentially lead to mistaking "slow touching" of the conductive object on the touch-sensor pad with a tap gesture. "Slow touching" 108 is illustrated in FIG. 1B. Slow touching 108 also crosses the pressure threshold 109 at two cross-points 112 and 113. The time measured between these two cross-points is less than the time threshold Ttap 107, and accordingly, is recognized as a tap gesture, when in fact the user is not tapping the touch-sensor pad, but is slowly touching the touch-sensor pad.

BRIEF DESCRIPTION OF THE DRAWINGS

The present invention is illustrated by way of example, and not by way of limitation, in the figures of the accompanying drawings.

DETAILED DESCRIPTION

Figure 1A:
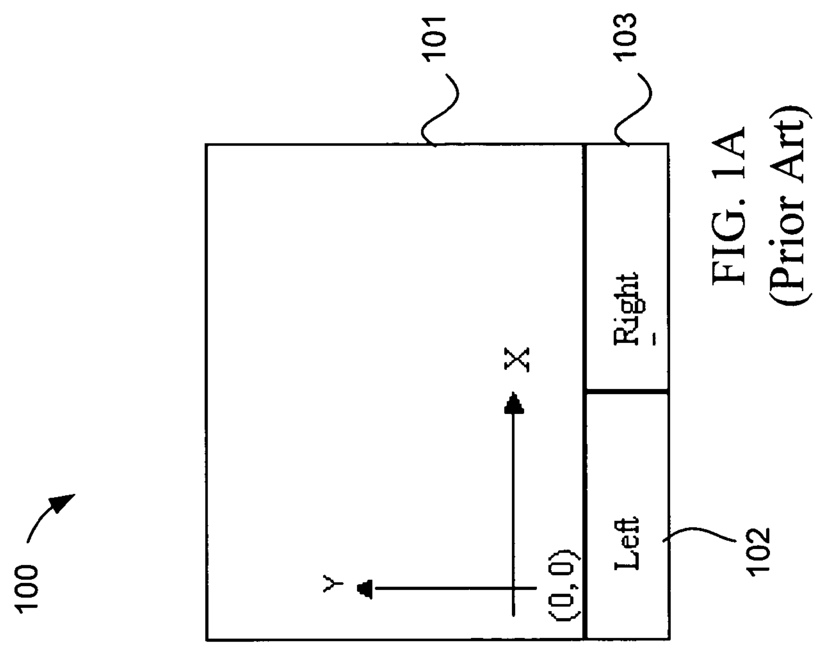
FIG. 1A illustrates a conventional touch-sensor pad.
Figure 1B:
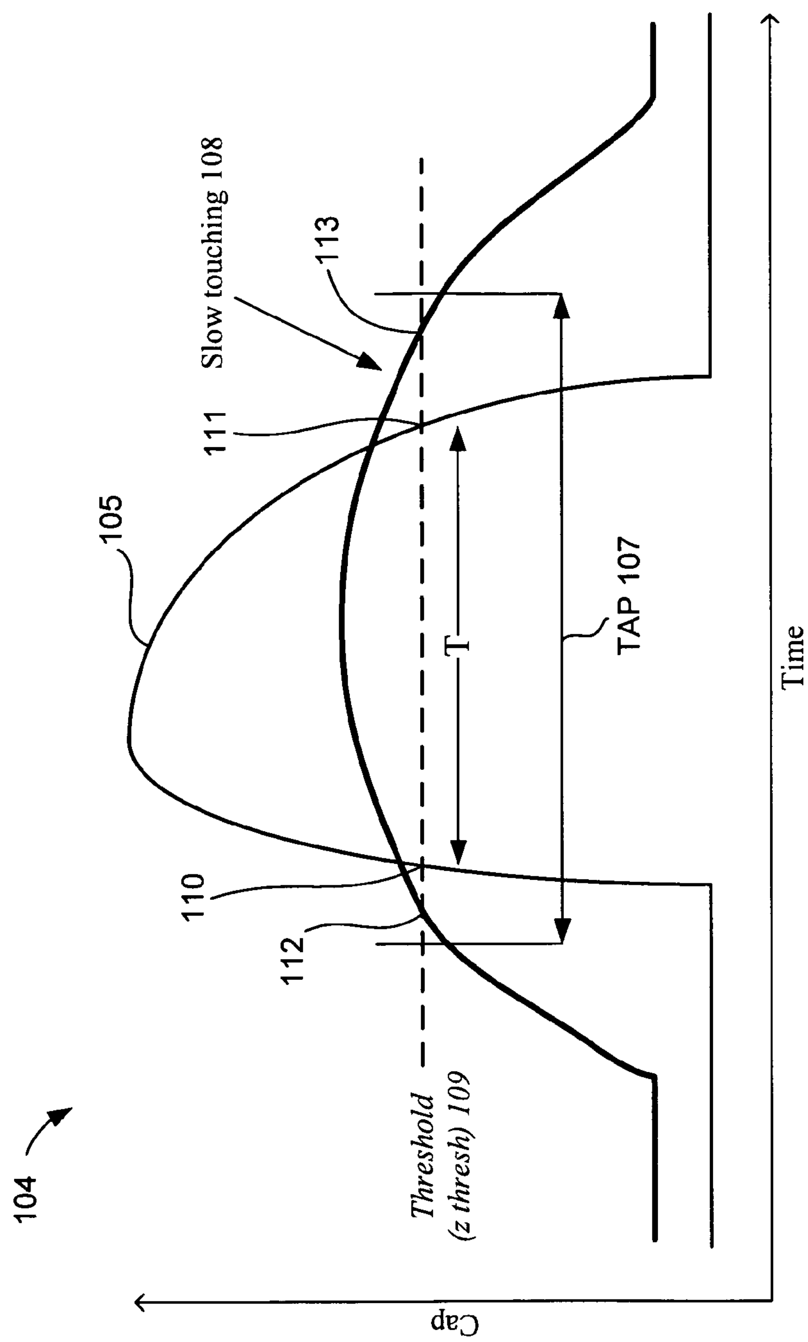
FIG. 1B illustrates a graph of the capacitance over time of the conventional touch-sensor pad described above.

Described herein is a method and apparatus for recognizing a tap gesture on a touch sensing device, such as a touch-sensor pad, touch-sensor slider, or a touch-sensor button. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of a method and apparatus are described to recognize a tap gesture on a sensing device. In one embodiment, the method may include detecting a presence of a conductive object on a sensing device, determining a velocity of the detected presence of the conductive object, and recognizing a tap gesture based on the velocity. Determining the velocity may include determining a capacitance of the conductive object on the sensing device over time, and determining a differential of the capacitance over the time. The differential is representative of the velocity of the presence, and the tap gesture is recognized based on the determined differential of the capacitance. The apparatus may include a sensing device having a plurality of sensor elements to detect a presence of a conductive object on the sensing device, and a processing device coupled to the sensing device. The processing device is configured to determine a velocity of the detected presence of the conductive object, and to recognize a tap gesture based on the velocity. In one embodiment, the velocity of the presence of the conductive object is the rate of change or differential of the capacitance on the sensing device.

The differential of the capacitance over time naturally captures the rising and falling edge, which represents the on- and off-actions of the tap gesture, respectively. Moreover, the shapes of the derived peaks yield more information. For example, a snappy action gives a sharp peak, while a slow touching action give rise to a mild peak, which can be easily quantified by the sharpness factor, Q, which is characteristic of the sharpness of the peak. In other words, the sharpness of the peak depends on the velocity of the presence of the conductive object, as the conductive object approaches and departs from the sensing device. The presence of the conductive object is when the conductive object is in or is substantially in contact with the sensing device. The sharpness factor Q may be determined using the height and width of the peak. The time distance between the 2 peaks (e.g., on- and off-actions) is evaluated and used as criteria, together with the Q values of the 2 peaks, to recognize a tap gesture. Using the differential algorithm, unlike the conventional touch-sensor pads, the embodiments described herein can distinguish between tap gestures and slow touching.

Figure 2:
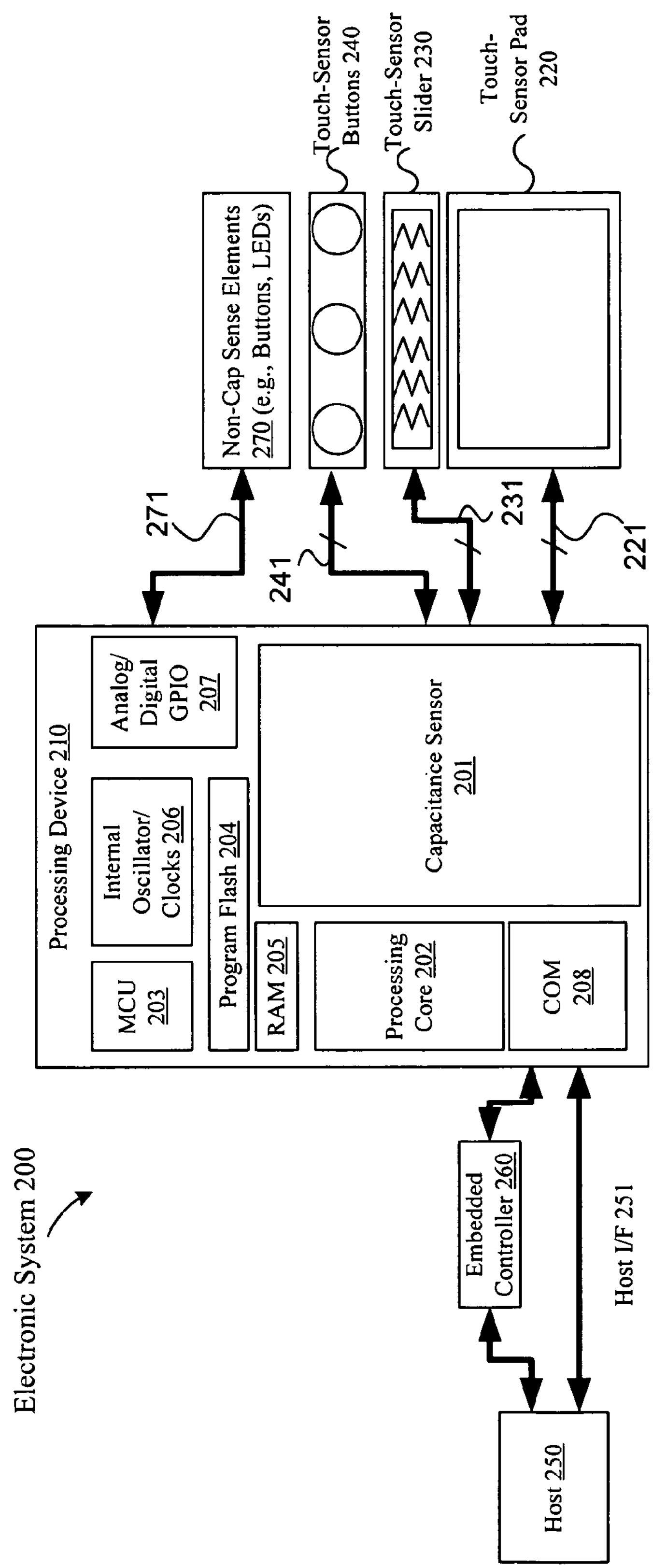
FIG. 2 illustrates a block diagram of one embodiment of an electronic system having a processing device for recognizing a tap gesture.

FIG. 2 illustrates a block diagram of one embodiment of an electronic system having a processing device for recognizing a tap gesture. Electronic system 200 includes processing device 210, touch-sensor pad 220, touch-sensor slider 230, touch-sensor buttons 240, host processor 250, embedded controller 260, and non-capacitance sensor elements 270. The processing device 210 may include analog and/or digital general purpose input/output ("GPIO") ports 207. GPIO ports 207 may be programmable. GPIO ports 207 may be coupled to a Programmable Interconnect and Logic ("PTh"), which acts as an interconnect between GPIO ports 207 and a digital block array of the processing device 210 (not illustrated). The digital block array may be configured to implement a variety of digital logic circuits (e.g., DAC, digital filters, digital control systems, etc.) using, in one embodiment, configurable user modules ("UMs"). The digital block array may be coupled to a system bus. Processing device 210 may also include memory, such as random access memory (RAM) 205 and program flash 204. RAM 205 may be static RAM (SRAM), and program flash 204 may be a non-volatile storage, which may be used to store firmware (e.g., control algorithms executable by processing core 202 to implement operations described herein). Processing device 210 may also include a memory controller unit (MCU) 203 coupled to memory and the processing core 202.

The processing device 210 may also include an analog block array (not illustrated). The analog block array is also coupled to the system bus. Analog block array also may be configured to implement a variety of analog circuits (e.g., ADC, analog filters, etc.) using configurable UMs. The analog block array may also be coupled to the GPIO 207.

As illustrated, capacitance sensor 201 may be integrated into processing device 210. Capacitance sensor 201 may include analog I/O for coupling to an external component, such as touch-sensor pad 220, touch-sensor slider 230, touch-sensor buttons 240, and/or other devices. Capacitance sensor 201 and processing device 202 are described in more detail below.

It should be noted that the embodiments described herein are not limited to touch-sensor pads for notebook implementations, but can be used in other capacitive sensing implementations, for example, the sensing device may be a touch-slider 230, or a touch-sensor 240 (e.g., capacitance sensing button). Similarly, the operations described herein are not limited to notebook cursor operations, but can include other operations, such as lighting control (dimmer), volume control, graphic equalizer control, speed control, or other control operations requiring gradual adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition and numeric keypad operation.

In one embodiment, the electronic system 200 includes a touch-sensor pad 220 coupled to the processing device 210 via bus 221. Touch-sensor pad 220 may include a multi-dimension sensor array. The multi-dimension sensor array comprises a plurality of sensor elements, organized as rows and columns. In another embodiment, the electronic system 200 includes a touch-sensor slider 230 coupled to the processing device 210 via bus 231. Touch-sensor slider 230 may include a single-dimension sensor array. The single-dimension sensor array comprises a plurality of sensor elements, organized as rows, or alternatively, as columns. In another embodiment, the electronic system 200 includes a touch-sensor button 240 coupled to the processing device 210 via bus 241. Touch-sensor button 240 may include a single-dimension or multi-dimension sensor array. The single- or multi-dimension sensor array comprises a plurality of sensor elements. For a touch-sensor button, the plurality of sensor elements may be coupled together to detect a presence of a conductive object over the entire surface of the sensing device. Capacitance sensor elements may be used as non-contact switches. These switches, when protected by an insulating layer, offer resistance to severe environments.

The electronic system 200 may include any combination of one or more of the touch-sensor pad 220, touch-sensor slider 230, and/or touch-sensor button 240. In another embodiment, the electronic system 200 may also include non-capacitance sensor elements 270 coupled to the processing device 210 via bus 271. The non-capacitance sensor elements 270 may include buttons, light emitting diodes (LEDs), and other user interface devices, such as a mouse, a keyboard, or other functional keys that do not require capacitance sensing. In one embodiment, buses 271, 241, 231, and 221 may be a single bus. Alternatively, these buses may be configured into any combination of one or more separate buses.

The processing device may also provide value-add functionality such as keyboard control integration, LEDs, battery charger and general purpose I/O, as illustrated as non-capacitance sensor elements 270. Non-capacitance sensor elements 270 are coupled to the GPIO 207.

Processing device 210 may include internal oscillator/clocks 206, and communication block 208. The oscillator/clocks block 206 provides clock signals to one or more of the components of processing device 210. Communication block 208 may be used to communicate with an external component, such as a host processor 250, via host interface (I/F) line 251. Alternatively, processing block 210 may also be coupled to embedded controller 260 to communicate with the external components, such as host 250. Interfacing to the host 250 can be through various methods. In one exemplary embodiment, interfacing with the host 250 may be done using a standard PS/2 interface to connect to an embedded controller 260, which in turn sends data to the host 250 via low pin count (LPC) interface. In some instances, it may be beneficial for the processing device 210 to do both touch-sensor pad and keyboard control operations, thereby freeing up the embedded controller 260 for other housekeeping functions. In another exemplary embodiment, interfacing may be done using a universal serial bus (USB) interface directly coupled to the host 250 via host interface line 251. Alternatively, the processing device 210 may communicate to external components, such as the host 250 using industry standard interfaces, such as USB, PS/2, inter-integrated circuit (I2C) bus, or system packet interface (SPI). The embedded controller 260 and/or embedded controller 260 may be coupled to the processing device 210 with a ribbon or flex cable from an assembly, which houses the touch-sensor pad and processing device.

In one embodiment, the processing device 210 is configured to communicate with the embedded controller 260 or the host 250 to send data. The data may be a command or alternatively a signal. In an exemplary embodiment, the electronic system 200 may operate in both standard-mouse compatible and enhanced modes. The standard-mouse compatible mode utilizes the HID class drivers already built into the Operating System (OS) software of host 250. These drivers enable the processing device 210 and sensing device to operate as a standard cursor control user interface device, such as a two-button PS/2 mouse. The enhanced mode may enable additional features such as scrolling (reporting absolute position) or disabling the sensing device, such as when a mouse is plugged into the notebook. Alternatively, the processing device 210 may be configured to communicate with the embedded controller 260 or the host 250, using non-OS drivers, such as dedicated touch-sensor pad drivers, or other drivers known by those of ordinary skill in the art.

In other words, the processing device 210 may operate to communicate data (e.g., commands or signals) using hardware, software, and/or firmware, and the data may be communicated directly to the processing device of the host 250, such as a host processor, or alternatively, may be communicated to the host 250 via drivers of the host 250, such as OS drivers, or other non-OS drivers. It should also be noted that the host 250 may directly communicate with the processing device 210 via host interface 251.

In one embodiment, the data sent to the host 250 from the processing device 210 includes click, double-click, movement of the cursor, scroll-up, scroll-down, scroll-left, scroll-right, step Back, and step Forward. Alternatively, other user interface device commands may be communicated to the host 250 from the processing device 210. These commands may be based on gestures occurring on the sensing device that are recognized by the processing device, such as tap, push, hop, and zigzag gestures. Alternatively, other commands may be recognized. Similarly, signals may be sent that indicate the recognition of these operations.

In particular, a tap gesture, for example, may be when the finger (e.g., conductive object) is on the sensing device for less than a threshold time. If the time the finger is placed on the touchpad is greater than the threshold time it may be considered to be a movement of the cursor, in the x- or y-axes. Scroll-up, scroll-down, scroll-left, and scroll-right, step back, and step-forward may be detected when the absolute position of the conductive object is within a pre-defined area, and movement of the conductive object is detected.

Processing device 210 may reside on a common carrier substrate such as, for example, an integrated circuit (IC) die substrate, a multi-chip module substrate, or the like. Alternatively, the components of processing device 210 may be one or more separate integrated circuits and/or discrete components. In one exemplary embodiment, processing device 210 may be a Programmable System on a Chip (PSoC™) processing device, manufactured by Cypress Semiconductor Corporation, San Jose, Calif. Alternatively, processing device 210 may be other one or more processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s).

Capacitance sensor 201 may be integrated into the IC of the processing device 210, or alternatively, in a separate IC. Alternatively, descriptions of capacitance sensor 201 may be generated and compiled for incorporation into other integrated circuits. For example, behavioral level code describing capacitance sensor 201, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 201.

It should be noted that the components of electronic system 200 may include all the components described above. Alternatively, electronic system 200 may include only some of the components described above.

In one embodiment, electronic system 200 may be used in a notebook computer. Alternatively, the electronic device may be used in other applications, such as a mobile handset, a personal data assistant (PDA), a keyboard, a television, a remote control, a monitor, a handheld multi-media device, a handheld video player, a handheld gaming device, or a control panel.

In one embodiment, capacitance sensor 201 may be a capacitive switch relaxation oscillator (CSR). The CSR may have an array of capacitive touch switches using a current-programmable relaxation oscillator, an analog multiplexer, digital counting functions, and high-level software routines to compensate for environmental and physical switch variations. The switch array may include combinations of independent switches, sliding switches (e.g., touch-sensor slider), and touch-sensor pads implemented as a pair of orthogonal sliding switches. The CSR may include physical, electrical, and software components. The physical component may include the physical switch itself, typically a pattern constructed on a printed circuit board (PCB) with an insulating cover, a flexible membrane, or a transparent overlay. The electrical component may include an oscillator or other means to convert a changed capacitance into a measured signal. The electrical component may also include a counter or timer to measure the oscillator output. The software component may include detection and compensation software algorithms to convert the count value into a switch detection decision. For example, in the case of slide switches or X-Y touch-sensor pads, a calculation for finding position of the conductive object to greater resolution than the physical pitch of the switches may be used.

It should be noted that there are various known methods for measuring capacitance. Although the embodiments described herein are described using a relaxation oscillator, the present embodiments are not limited to using relaxation oscillators, but may include other methods, such as current versus voltage phase shift measurement, resistor-capacitor charge timing, capacitive bridge divider or, charge transfer.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitor values may require very large resistors for reasonable timing. The capacitive bridge divider may include driving the capacitor under test through a fixed reference capacitor. The reference capacitor and the capacitor under test form a voltage divider. The voltage signal is recovered with a synchronous demodulator, which may be done in the processing device 210. The charge transfer may be conceptually similar to an R-C charging circuit. In this method, Cp is the capacitance being sensed. $C_{SUM}$ is the summing capacitor, into which charge is transferred on successive cycles. At the start of the measurement cycle, the voltage on $C_{SUM}$ is reset. The voltage on $C_{SUM}$ increases exponentially (and only slightly) with each clock cycle. The time for this voltage to reach a specific threshold is measured with a counter. Additional details regarding these alternative embodiments have not been included so as to not obscure the present embodiments, and because these alternative embodiments for measuring capacitance are known by those of ordinary skill in the art.

Figure 3A:
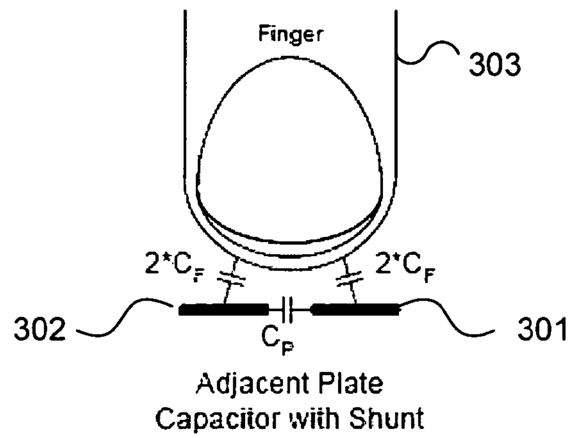
FIG. 3A illustrates a varying switch capacitance.
Figure 3B:
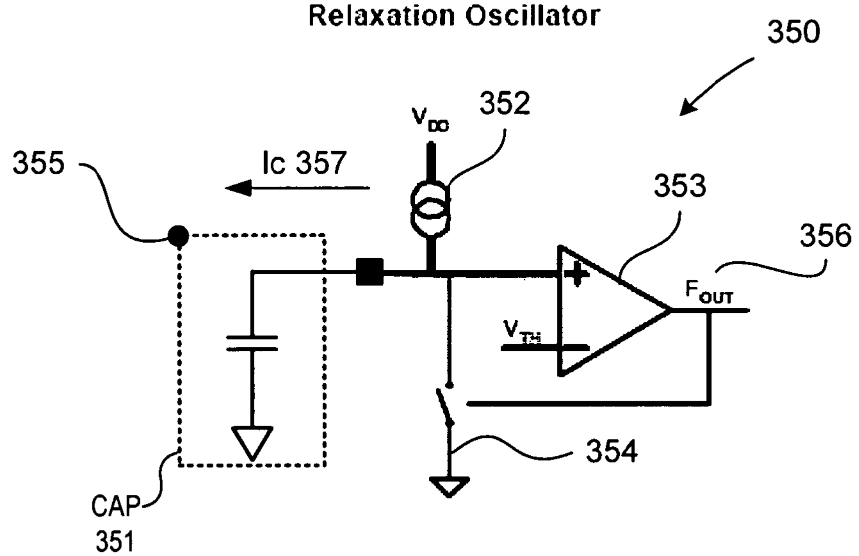
FIG. 3B illustrates one embodiment of a relaxation oscillator.

FIG. 3A illustrates a varying switch capacitance. In its basic form, a capacitive switch 300 is a pair of adjacent plates 301 and 302. There is a small edge-to-edge capacitance Cp, but the intent of switch layout is to minimize the base capacitance Cp between these plates. When a conductive object 303 (e.g., finger) is placed in proximity to the two plate 301 and 302, there is a capacitance 2*Cf between one electrode 301 and the conductive object 303 and a similar capacitance 2*Cf between the conductive object 303 and the other electrode 302. The capacitance between one electrode 301 and the conductive object 303 and back to the other electrode 302 adds in parallel to the base capacitance Cp between the plates 301 and 302, resulting in a change of capacitance Cf. Capacitive switch 300 may be used in a capacitance switch array. The capacitance switch array is a set of capacitors where one side of each is grounded. Thus, the active capacitor (as represented in FIG. 3B as capacitor 351) has only one accessible side. The presence of the conductive object 303 increases the capacitance (Cp+Cf) of the switch 300 to ground. Determining switch activation is then a matter of measuring change in the capacitance (CO. Switch 300 is also known as a grounded variable capacitor. In one exemplary embodiment, Cf may range from approximately 10-30 picofarads (pF). Alternatively, other ranges may be used.

The conductive object in this case is a finger, alternatively, this technique may be applied to any conductive object, for example, a conductive door switch, position sensor, or conductive pen in a stylus tracking system.

FIG. 3B illustrates one embodiment of a relaxation oscillator. The relaxation oscillator 350 is formed by the capacitance to be measured on capacitor 351, a charging current source 352, a comparator 353, and a reset switch 354. It should be noted that capacitor 351 is representative of the capacitance measured on a sensor element of a sensor array. The relaxation oscillator is coupled to drive a charging current (Ic) 357 in a single direction onto a device under test ("DUT") capacitor, capacitor 351. As the charging current piles charge onto the capacitor 351, the voltage across the capacitor increases with time as a function of Ic 357 and its capacitance C. Equation (1) describes the relation between current, capacitance, voltage and time for a charging capacitor.

$$CdV=I_C dt \tag{1}$$

The relaxation oscillator begins by charging the capacitor 351 from a ground potential or zero voltage and continues to pile charge on the capacitor 351 at a fixed charging current Ic 357 until the voltage across the capacitor 351 at node 355 reaches a reference voltage or threshold voltage, $V_{TH}$ 355. At $V_{TH}$ 355, the relaxation oscillator allows the accumulated charge at node 355 to discharge (e.g., the capacitor 351 to "relax" back to the ground potential) and then the process repeats itself. In particular, the output of comparator 353 asserts a clock signal $F_{OUT}$ 356 (e.g., $F_{OUT}$ 356 goes high), which enables the reset switch 354. This resets the voltage on the capacitor at node 355 to ground and the charge cycle starts again. The relaxation oscillator outputs a relaxation oscillator clock signal ($F_{OUT}$ 356) having a frequency ($f_{RO}$) dependent upon capacitance C of the capacitor 351 and charging current Ic 357.

The comparator trip time of the comparator 353 and reset switch 354 add a fixed delay. The output of the comparator 353 is synchronized with a reference system clock to guarantee that the comparator reset time is long enough to completely reset the charging voltage on capacitor 355. This sets a practical upper limit to the operating frequency. For example, if capacitance C of the capacitor 351 changes, then $f_{RO}$ will change proportionally according to Equation (1). By comparing $f_{RO}$ of $F_{OUT}$ 356 against the frequency ($f_{REF}$) of a known reference system clock signal (REF CLK), the change in capacitance ΔC can be measured. Accordingly, equations (2) and (3) below describe that a change in frequency between $F_{OUT}$ 356 and REF CLK is proportional to a change in capacitance of the capacitor 351.

$$\Delta C \propto \Delta f, \text{ where} \quad (2)$$

$$\Delta f = f_{RO} - f_{REF}. \quad (3)$$

In one embodiment, a frequency comparator may be coupled to receive relaxation oscillator clock signal ($F_{our}$ 356) and REF CLK, compare their frequencies $f_{RO}$ and $f_{REF}$, respectively, and output a signal indicative of the difference Δf between these frequencies. By monitoring Δf one can determine whether the capacitance of the capacitor 351 has changed.

In one exemplary embodiment, the relaxation oscillator 350 may be built using a 555 timer to implement the comparator 353 and reset switch 354. Alternatively, the relaxation oscillator 350 may be built using other circuiting. Relaxation oscillators are known in by those of ordinary skill in the art, and accordingly, additional details regarding their operation have not been included so as to not obscure the present embodiments.

Figure 4:
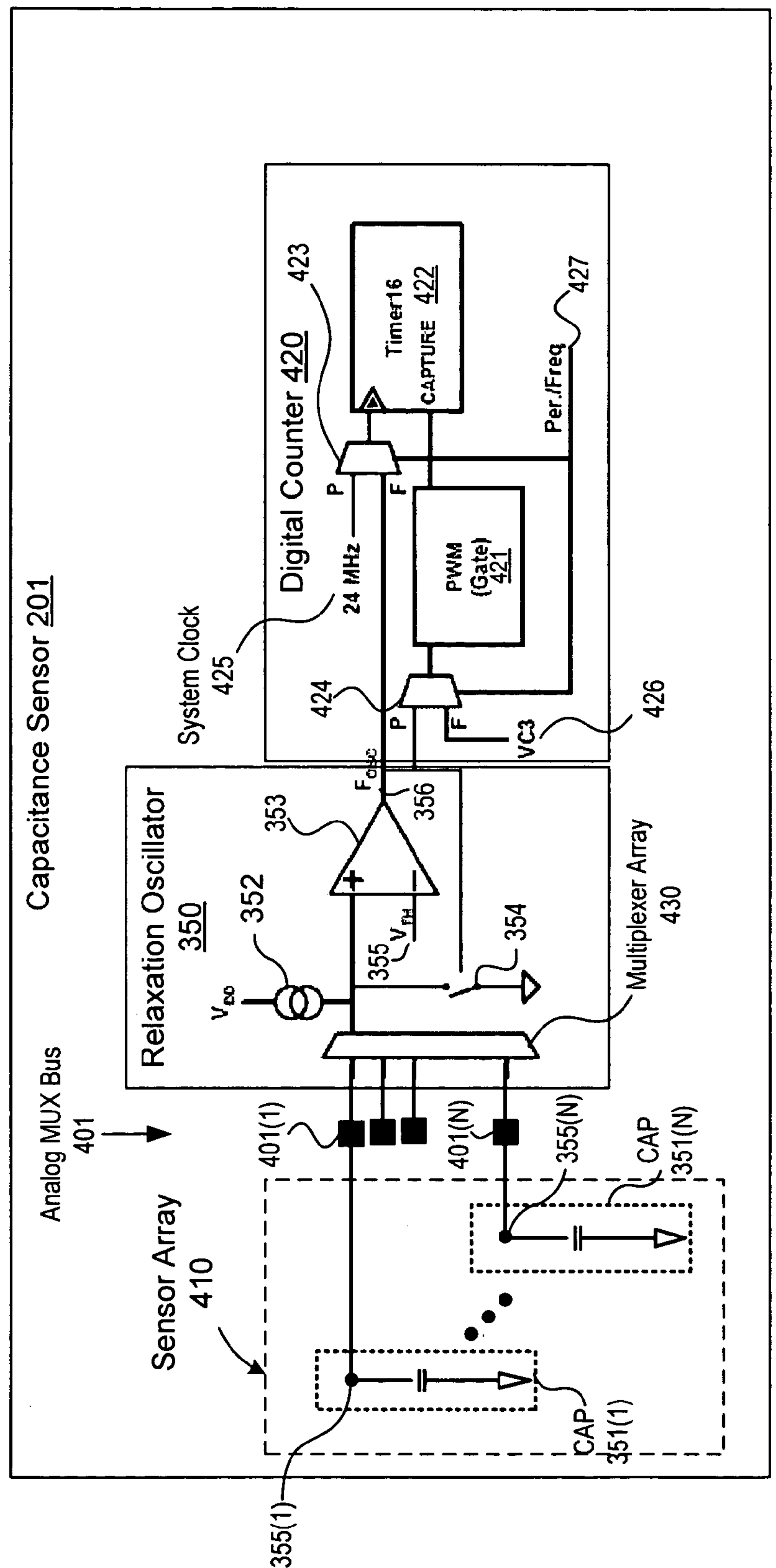
FIG. 4 illustrates a block diagram of one embodiment of a capacitance sensor including a relaxation oscillator and digital counter.

FIG. 4 illustrates a block diagram of one embodiment of a capacitance sensor including a relaxation oscillator and digital counter. Capacitance sensor 201 of FIG. 4 includes a sensor array 410 (also known as a switch array), relaxation oscillator 350, and a digital counter 420. Sensor array 410 includes a plurality of sensor elements 355(1)-355(N), where N is a positive integer value that represents the number of rows (or alternatively columns) of the sensor array 410. Each sensor element is represented as a capacitor, as previously described with respect to FIG. 3B. The sensor array 410 is coupled to relaxation oscillator 350 via an analog bus 401 having a plurality of pins 401(1)-401(N). In one embodiment, the sensor array 410 may be a single-dimension sensor array including the sensor elements 355(1)-355(N), where N is a positive integer value that represents the number of sensor elements of the single-dimension sensor array. The single-dimension sensor array 410 provides output data to the analog bus 401 of the processing device 210 (e.g., via lines 231). Alternatively, the sensor array 410 may be a multi-dimension sensor array including the sensor elements 355(1)-355(N), where N is a positive integer value that represents the number of sensor elements of the multi-dimension sensor array. The multi-dimension sensor array 410 provides output data to the analog bus 401 of the processing device 210 (e.g., via bus 221).

Relaxation oscillator 350 of FIG. 4 includes all the components described with respect to FIG. 3B, and a selection circuit 430. The selection circuit 430 is coupled to the plurality of sensor elements 355(1)-355(N), the reset switch 354, the current source 352, and the comparator 353. Selection circuit 430 may be used to allow the relaxation oscillator 350 to measure capacitance on multiple sensor elements (e.g., rows or columns). The selection circuit 430 may be configured to sequentially select a sensor element of the plurality of sensor elements to provide the charge current and to measure the capacitance of each sensor element. In one exemplary embodiment, the selection circuit 430 is a multiplexer array of the relaxation oscillator 350. Alternatively, selection circuit may be other circuitry outside the relaxation oscillator 350, or even outside the capacitance sensor 201 to select the sensor element to be measured. Capacitance sensor 201 may include one relaxation oscillator and digital counter for the plurality of sensor elements of the sensor array. Alternatively, capacitance sensor 201 may include multiple relaxation oscillators and digital counters to measure capacitance on the plurality of sensor elements of the sensor array. The multiplexer array may also be used to ground the sensor elements that are not being measured. This may be done in conjunction with a dedicated pin in the GP10 port 207.

In another embodiment, the capacitance sensor 201 may be configured to simultaneously scan the sensor elements, as opposed to being configured to sequentially scan the sensor elements as described above. For example, the sensing device may include a sensor array having a plurality of rows and columns. The rows may be scanned simultaneously, and the columns may be scanned simultaneously.

In one exemplary embodiment, the voltages on all of the rows of the sensor array are simultaneously moved, while the voltages of the columns are held at a constant voltage, with the complete set of sampled points simultaneously giving a profile of the conductive object in a first dimension. Next, the voltages on all of the rows are held at a constant voltage, while the voltages on all the rows are simultaneously moved, to obtain a complete set of sampled points simultaneously giving a profile of the conductive object in the other dimension.

In another exemplary embodiment, the voltages on all of the rows of the sensor array are simultaneously moved in a positive direction, while the voltages of the columns are moved in a negative direction. Next, the voltages on all of the rows of the sensor array are simultaneously moved in a negative direction, while the voltages of the columns are moved in a positive direction. This technique doubles the effect of any transcapacitance between the two dimensions, or conversely, halves the effect of any parasitic capacitance to the ground. In both methods, the capacitive information from the sensing process provides a profile of the presence of the conductive object to the sensing device in each dimension. Alternatively, other methods for scanning known by those of ordinary skill in the art may be used to scan the sensing device.

Digital counter 420 is coupled to the output of the relaxation oscillator 350. Digital counter 420 receives the relaxation oscillator output signal 356 ($F_{OUT}$). Digital counter 420 is configured to count at least one of a frequency or a period of the relaxation oscillator output received from the relaxation oscillator.

As previously described with respect to the relaxation oscillator 350, when a finger or conductive object is placed on the switch, the capacitance increases from Cp to Cp+Cf so the relaxation oscillator output signal 356 ($F_{our}$) decreases. The relaxation oscillator output signal 356 ($F_{our}$) is fed to the digital counter 420 for measurement. There are two methods for counting the relaxation oscillator output signal 356, frequency measurement and period measurement. In one embodiment, the digital counter 420 may include two multiplexers 423 and 424. Multiplexers 423 and 424 are configured to select the inputs for the PWM 421 and the timer 422 for the two measurement methods, frequency and period measurement methods. Alternatively, other selection circuits may be used to select the inputs for the PWM 421 and the time 422. In another embodiment, multiplexers 423 and 424 are not included in the digital counter, for example, the digital counter 420 may be configured in one, or the other, measurement configuration.

In the frequency measurement method, the relaxation oscillator output signal 356 is counted for a fixed period of time. The counter 422 is read to obtain the number of counts during the gate time. This method works well at low frequencies where the oscillator reset time is small compared to the oscillator period. A pulse width modulator (PWM) 441 is clocked for a fixed period by a derivative of the system clock, VC3 426 (which is a divider from the 24 MHz system clock 425). Pulse width modulation is a modulation technique that generates variable-length pulses to represent the amplitude of an analog input signal; in this case VC3 426. The output of PWM 421 enables timer 422 (e.g., 16-bit). The relaxation oscillator output signal 356 clocks the timer 422. The timer 422 is reset at the start of the sequence, and the count value is read out at the end of the gate period.

In the period measurement method, the relaxation oscillator output signal 356 gates a counter 422, which is clocked by the system clock 425 (e.g., 24 MHz). In order to improve sensitivity and resolution, multiple periods of the oscillator are counted with the PWM 421. The output of PWM 421 is used to gate the timer 422. In this method, the relaxation oscillator output signal 356 drives the clock input of PWM 421. As previously described, pulse width modulation is a modulation technique that generates variable-length pulses to represent the amplitude of an analog input signal; in this case the relaxation oscillator output signal 356. The output of the PWM 421 enables a timer 422 (e.g., 16-bit), which is clocked at the system clock frequency 425 (e.g., 24 MHz). When the output of PWM 421 is asserted (e.g., goes high), the count starts by releasing the capture control. When the terminal count of the PWM 421 is reached, the capture signal is asserted (e.g., goes high), stopping the count and setting the PWM's interrupt. The timer value is read in this interrupt. The relaxation oscillator 350 is indexed to the next switch (e.g., capacitor 351(2)) to be measured and the count sequence is started again.

The two counting methods may have equivalent performance in sensitivity and signal-to-noise ratio (SNR). The period measurement method may have a slightly faster data acquisition rate, but this rate is dependent on software load and the values of the switch capacitances. The frequency measurement method has a fixed-switch data acquisition rate.

The length of the counter 422 and the detection time required for the switch are determined by sensitivity requirements. Small changes in the capacitance on capacitor 351 result in small changes in frequency. In order to find these small changes, it may be necessary to count for a considerable time.

At startup (or boot) the switches (e.g., capacitors 351(1)-(N)) are scanned and the count values for each switch with no actuation are stored as a baseline array (Cp). The presence of a finger on the switch is determined by the difference in counts between a stored value for no switch actuation and the acquired value with switch actuation, referred to here as Δn. The sensitivity of a single switch is approximately:

$$\frac{\Delta n}{n} = \frac{Cf}{Cp} \tag{4}$$

The value of Δn should be large enough for reasonable resolution and clear indication of switch actuation. This drives switch construction decisions.

Cf should be as large a fraction of Cp as possible. In one exemplary embodiment, the fraction of Cf/Cp ranges between approximately 0.01 to approximately 2.0. Alternatively, other fractions may be used for Cf/Cp. Since Cf is determined by finger area and distance from the finger to the switch's conductive traces (through the over-lying insulator), the baseline capacitance Cp should be minimized. The baseline capacitance Cp includes the capacitance of the switch pad plus any parasitics, including routing and chip pin capacitance.

In switch array applications, variations in sensitivity should be minimized. If there are large differences in Δn, one switch may actuate at 1.0 cm, while another may not actuate until direct contact. This presents a non-ideal user interface device. There are numerous methods for balancing the sensitivity. These may include precisely matching on-board capacitance with PC trace length modification, adding balance capacitors on each switch's PC board trace, and/or adapting a calibration factor to each switch to be applied each time the switch is tested.

In one embodiment, the PCB design may be adapted to minimize capacitance, including thicker PCBs where possible. In one exemplary embodiment, a 0.062 inch thick PCB is used. Alternatively, other thicknesses may be used, for example, a 0.015 inch thick PCB.

It should be noted that the count window should be long enough for Δn to be a "significant number." In one embodiment, the "significant number" can be as little as 10, or alternatively, as much as several hundred. In one exemplary embodiment, where Cf is 1.0% of Cp (a typical "weak" switch), and where the switch threshold is set at a count value of 20, n is found to be:

$$n = \Delta n \cdot \frac{Cf}{Cp} = 2000 \tag{5}$$

Adding some margin to yield 2500 counts, and running the frequency measurement method at 1.0 MHz, the detection time for the switch is 4 microseconds. In the frequency measurement method, the frequency difference between a switch with and without actuation (i.e., CP+CF vs. CP) is approximately:

$$\Delta n = \frac{t_{count} \cdot i_c}{V_{TH}} \frac{Cf}{Cp^2} \tag{6}$$

This shows that the sensitivity variation between one channel and another is a function of the square of the difference in the two channels' static capacitances. This sensitivity difference can be compensated using routines in the high-level Application Programming Interfaces (APIs).

In the period measurement method, the count difference between a switch with and without actuation (i.e., CP+CF vs. CP) is approximately:

$$\Delta n = N_{Periods} \cdot \frac{Cf \cdot V_{TH}}{i_C} \cdot f_{SysClk} \quad (7)$$

The charge currents are typically lower and the period is longer to increase sensitivity, or the number of periods for which $f_{SysClk}$ is counted can be increased. In either method, by matching the static (parasitic) capacitances Cp of the individual switches, the repeatability of detection increases, making all switches work at the same difference. Compensation for this variation can be done in software at runtime. The compensation algorithms for both the frequency method and period method may be included in the high-level APIs.

Some implementations of this circuit use a current source programmed by a fixed-resistor value. If the range of capacitance to be measured changes, external components, (i.e., the resistor) should be adjusted.

Using the multiplexer array 430, multiple sensor elements may be sequentially scanned to provide current to and measure the capacitance from the capacitors (e.g., sensor elements), as previously described. In other words, while one sensor element is being measured, the remaining sensor elements are grounded using the GPIO port 207. This drive and multiplex arrangement bypasses the existing GPIO to connect the selected pin to an internal analog multiplexer (mux) bus. The capacitor charging current (e.g., current source 352) and reset switch 353 are connected to the analog mux bus. This may limit the pin-count requirement to simply the number of switches (e.g., capacitors 351(1)-351(N)) to be addressed. In one exemplary embodiment, no external resistors or capacitors are required inside or outside the processing device 210 to enable operation.

The capacitor charging current for the relaxation oscillator 350 is generated in a register programmable current output DAC (also known as IDAC). Accordingly, the current source 352 is a current DAC or IDAC. The IDAC output current may be set by an 8-bit value provided by the processing device 210, such as from the processing core 202. The 8-bit value may be stored in a register or in memory.

Estimating and measuring PCB capacitances may be difficult; the oscillator-reset time may add to the oscillator period (especially at higher frequencies); and there may be some variation to the magnitude of the IDAC output current with operating frequency. Accordingly, the optimum oscillation frequency and operating current for a particular switch array may be determined to some degree by experimentation.

In many capacitive switch designs the two "plates" (e.g., 301 and 302) of the sensing capacitor are actually adjacent PCB pads or traces, as indicated in FIG. 3A. Typically, one of these plates is grounded. Layouts for touch-sensor slider (e.g., linear slide switches) and touch-sensor pad applications have switches that are immediately adjacent. In this case, all of the switches that are not active are grounded through the GPIO 207 of the processing device 210 dedicated to that pin. The actual capacitance between adjacent plates is small (Cp), but the capacitance of the active plate (and its PCB trace back to the processing device 210) to ground, when detecting the presence of the conductive object 303, may be considerably higher (Cp+Cf). The capacitance of two parallel plates is given by the following equation:

$$C = \varepsilon_0 \cdot \varepsilon_R \cdot \frac{A}{d} = \varepsilon_R \cdot 8.85 \cdot \frac{A}{d} \text{ pF/m} \quad (8)$$

The dimensions of equation (8) are in meters. This is a very simple model of the capacitance. The reality is that there are fringing effects that substantially increase the switch-to-ground (and PCB trace-to-ground) capacitance.

Switch sensitivity (i.e., actuation distance) may be increased by one or more of the following: 1) increasing board thickness to increase the distance between the active switch and any parasitics; 2) minimizing PC trace routing underneath switches; 3) utilizing a grided ground with 50% or less fill if use of a ground plane is absolutely necessary; 4) increasing the spacing between switch pads and any adjacent ground plane; 5) increasing pad area; 6) decreasing thickness of any insulating overlay; or 7) verifying that there is no air-gap between the PC pad surface and the touching finger.

There is some variation of switch sensitivity as a result of environmental factors. A baseline update routine, which compensates for this variation, may be provided in the high-level APIs.

Sliding switches are used for control requiring gradual adjustments. Examples include a lighting control (dimmer), volume control, graphic equalizer, and speed control. These switches are mechanically adjacent to one another. Actuation of one switch results in partial actuation of physically adjacent switches. The actual position in the sliding switch is found by computing the centroid location of the set of switches activated.

In applications for touch-sensor sliders (e.g., sliding switches) and touch-sensor pads it is often necessary to determine finger (or other capacitive object) position to more resolution than the native pitch of the individual switches. The contact area of a finger on a sliding switch or a touch-pad is often larger than any single switch. In one embodiment, in order to calculate the interpolated position using a centroid, the array is first scanned to verify that a given switch location is valid. The requirement is for some number of adjacent switch signals to be above a noise threshold. When the strongest signal is found, this signal and those immediately adjacent are used to compute a centroid:

$$\text{Centroid} = \frac{n_{i-1} \cdot (i-1) + n_i i + n_{i+1} \cdot (i+1)}{n_{i-1} + n_i i + n_{i+1}} \quad (9)$$

The calculated value will almost certainly be fractional. In order to report the centroid to a specific resolution, for example a range of 0 to 100 for 12 switches, the centroid value may be multiplied by a calculated scalar. It may be more efficient to combine the interpolation and scaling operations into a single calculation and report this result directly in the desired scale. This may be handled in the high-level APIs. Alternatively, other methods may be used to interpolate the position of the conductive object.

A physical touchpad assembly is a multi-layered module to detect a conductive object. In one embodiment, the multi-layer stack-up of a touchpad assembly includes a PCB, an adhesive layer, and an overlay. The PCB includes the processing device 210 and other components, such as the connector to the host 250, necessary for operations for sensing the capacitance. These components are on the non-sensing side of the PCB. The PCB also includes the sensor array on the opposite side, the sensing side of the PCB. Alternatively, other multi-layer stack-ups may be used in the touchpad assembly.

The PCB may be made of standard materials, such as FR4 or Kapton™ (e.g., flexible PCB). In either case, the processing device 210 may be attached (e.g., soldered) directly to the sensing PCB (e.g., attached to the non-sensing side of the PCB). The PCB thickness varies depending on multiple variables, including height restrictions and sensitivity requirements. In one embodiment, the PCB thickness is at least approximately 0.3 millimeters (mm). Alternatively, the PCB may have other thicknesses. It should be noted that thicker PCBs may yield better results. The PCB length and width is dependent on individual design requirements for the device on which the sensing device is mounted, such as a notebook or mobile handset.

The adhesive layer is directly on top of the PCB sensing array and is used to affix the overlay to the overall touchpad assembly. Typical material used for connecting the overlay to the PCB is non-conductive adhesive such as 3M 467 or 468. In one exemplary embodiment, the adhesive thickness is approximately 0.05 mm. Alternatively, other thicknesses may be used.

The overlay may be non-conductive material used to protect the PCB circuitry to environmental elements and to insulate the user's finger (e.g., conductive object) from the circuitry. Overlay can be ABS plastic, polycarbonate, glass, or Mylar™ Alternatively, other materials known by those of ordinary skill in the art may be used. In one exemplary embodiment, the overlay has a thickness of approximately 1.0 mm. In another exemplary embodiment, the overlay thickness has a thickness of approximately 2.0 mm. Alternatively, other thicknesses may be used.

The sensor array may be a grid-like pattern of sensor elements (e.g., capacitive elements) used in conjunction with the processing device 210 to detect a presence of a conductive object, such as finger, to a resolution greater than that which is native. The touch-sensor pad layout pattern maximizes the area covered by conductive material, such as copper, in relation to spaces necessary to define the rows and columns of the sensor array.

Figure 5A:
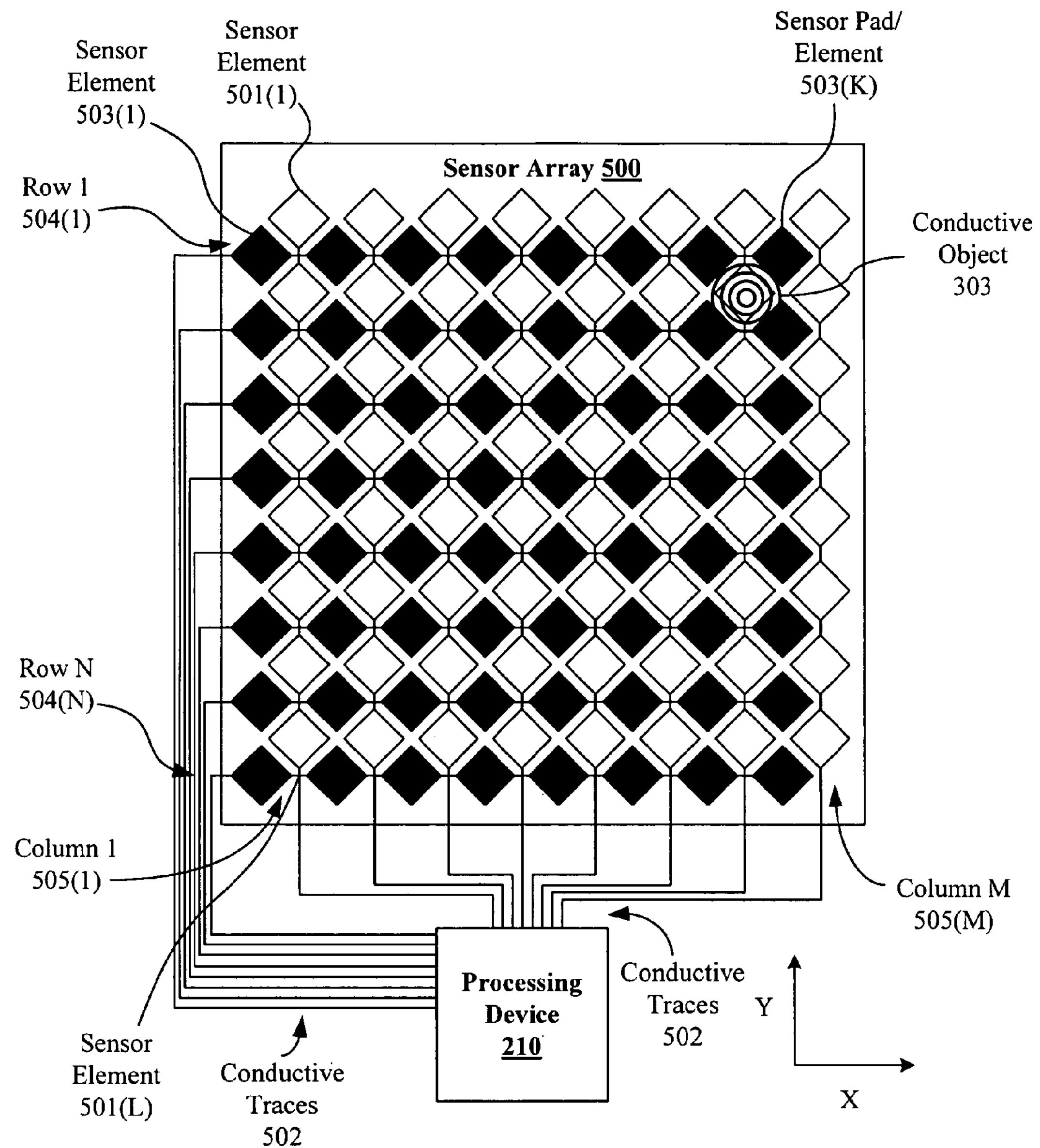
FIG. 5A illustrates a top-side view of one embodiment of a sensor array having a plurality of sensor elements for detecting a presence of a conductive object on the sensor array of a touch-sensor pad.

FIG. 5A illustrates a top-side view of one embodiment of a sensor array having a plurality of sensor elements for detecting a presence of a conductive object 303 on the sensor array 500 of a touch-sensor pad. Touch-sensor pad 220 includes a sensor array 500. Sensor array 500 includes a plurality of rows 504(1)-504(N) and a plurality of columns 505(1)-505(M), where N is a positive integer value representative of the number of rows and M is a positive integer value representative of the number of columns. Each row includes a plurality of sensor elements 503(1)-503(K), where K is a positive integer value representative of the number of sensor elements in the row. Each column includes a plurality of sensor elements 501(1)-501(L), where L is a positive integer value representative of the number of sensor elements in the column. Accordingly, sensor array is an N×M sensor matrix. The N×M sensor matrix, in conjunction with the processing device 210, is configured to detect a position of a presence of the conductive object 303 in the x-, and y-directions.

Figure 5B:
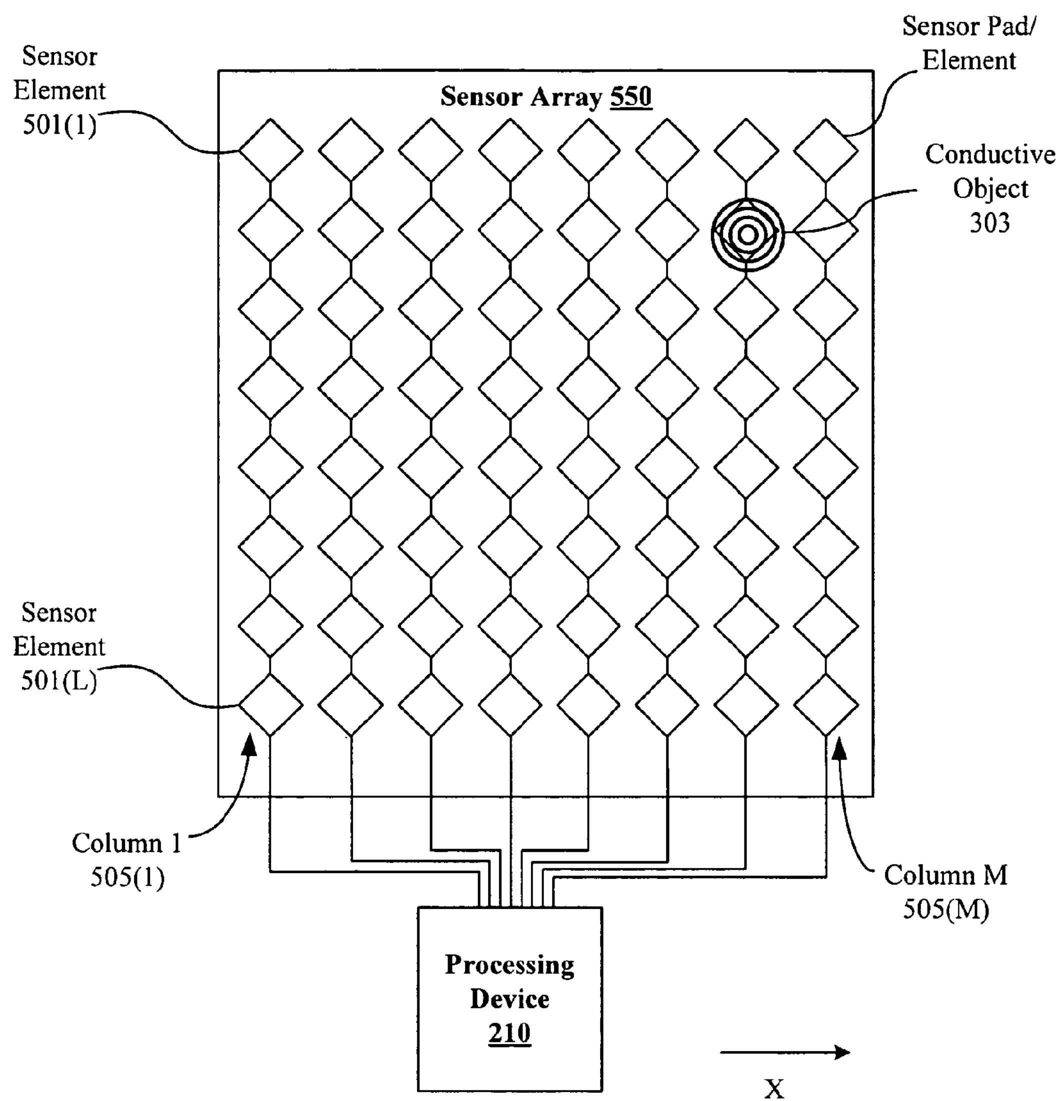
FIG. 5B illustrates a top-side view of one embodiment of a sensor array having a plurality of sensor elements for detecting a presence of a conductive object on the sensor array of a touch-sensor slider

FIG. 5B illustrates a top-side view of one embodiment of a sensor array having a plurality of sensor elements for detecting a presence of a conductive object 303 on the sensor array 550 of a touch-sensor slider. Touch-sensor slider 230 includes a sensor array 550. Sensor array 550 includes a plurality of columns 504(1)-504(M), where M is a positive integer value representative of the number of columns. Each column includes a plurality of sensor elements 501(1)-501(L), where L is a positive integer value representative of the number of sensor elements in the column. Accordingly, sensor array is a 1×M sensor matrix. The 1×M sensor matrix, in conjunction with the processing device 210, is configured to deteCt a position of a presence of the conductive object 303 in the x-direction. It should be noted that sensor array 500 may be configured to function as a touch-sensor slider 230.

Alternating columns in FIG. 5A correspond to x- and y-axis elements. The y-axis sensor elements 503(1)-503(K) are illustrated as black diamonds in FIG. 5A, and the x-axis sensor elements 501(1)-501(L) are illustrated as white diamonds in FIG. 5A and FIG. 5B. It should be noted that other shapes may be used for the sensor elements. In another embodiment, the columns and row may include vertical and horizontal bars (e.g., rectangular shaped bars), however, this design may include additional layers in the PCB to allow the vertical and horizontal bars to be positioned on the PCB so that they are not in contact with one another.

Figure 5C:
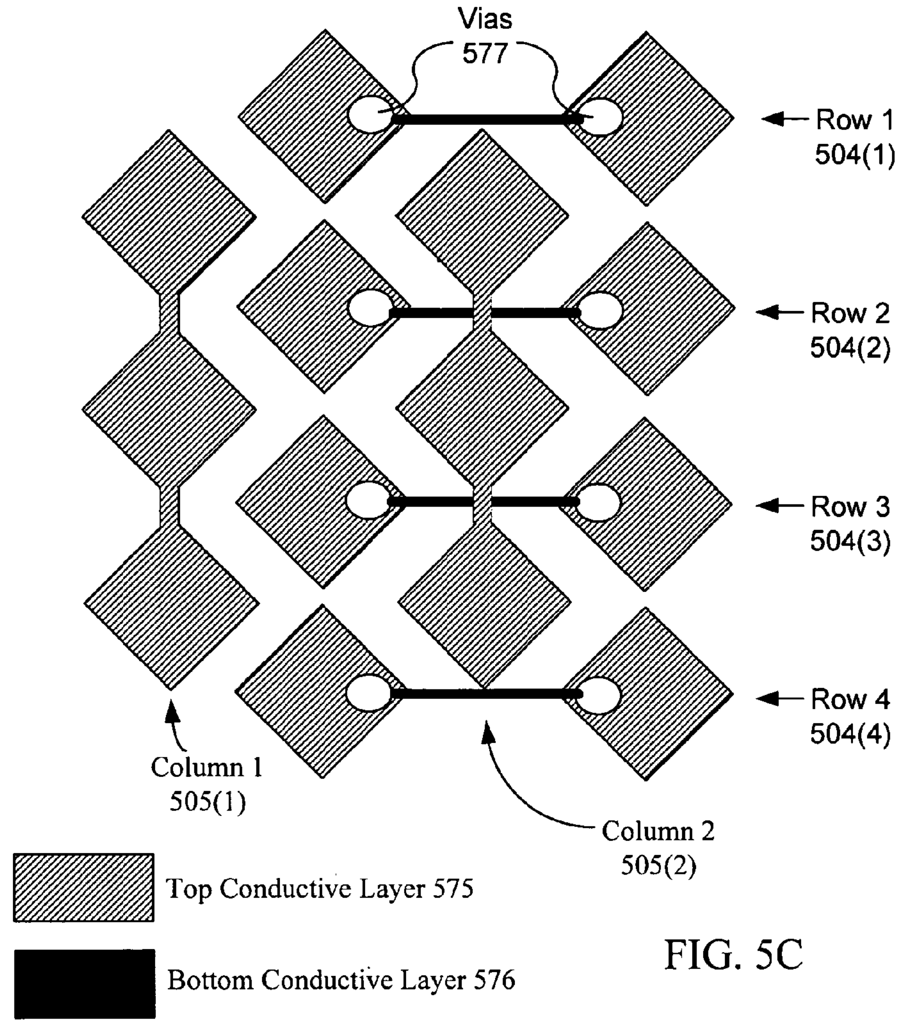
FIG. 5C illustrates a top-side view of one embodiment of a two-layer touch-sensor pad.
Figure 5D:
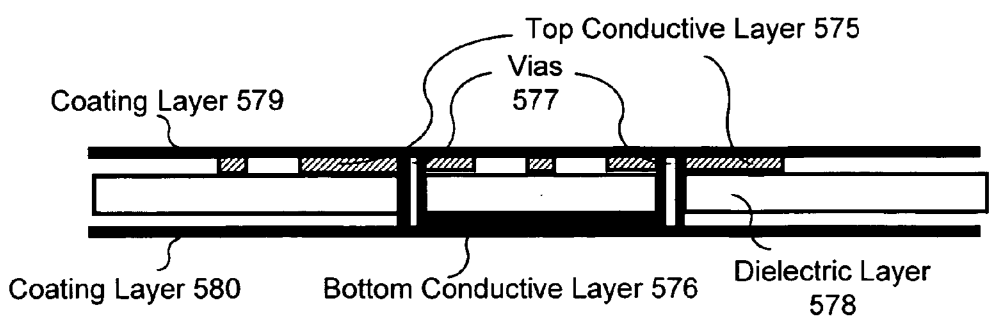
FIG. 5D illustrates a side view of one embodiment of the two-layer touch-sensor pad of FIG. 5C.

FIGS. 5C and 5D illustrate top-side and side views of one embodiment of a two-layer touch-sensor pad. Touch-sensor pad, as illustrated in FIGS. 5C and 5D, include the first two columns 505(1) and 505(2), and the first four rows 504(1)-504(4) of sensor array 500. The sensor elements of the first column 501(1) are connected together in the top conductive layer 575, illustrated as hashed diamond sensor elements and connections. The diamond sensor elements of each column, in effect, form a chain of elements. The sensor elements of the second column 501(2) are similarly connected in the top conductive layer 575. The sensor elements of the first row 504(1) are connected together in the bottom conductive layer 575 using vias 577, illustrated as black diamond sensor elements and connections. The diamond sensor elements of each row, in effect, form a chain of elements. The sensor elements of the second, third, and fourth rows 504(2)-504(4) are similarly connected in the bottom conductive layer 576.

As illustrated in FIG. 5D, the top conductive layer 575 includes the sensor elements for both the columns and the rows of the sensor array, as well as the connections between the sensor elements of the columns of the sensor array. The bottom conductive layer 576 includes the conductive paths that connect the sensor elements of the rows that reside in the top conductive layer 575. The conductive paths between the sensor elements of the rows use vias 577 to connect to one another in the bottom conductive layer 576. Vias 577 go from the top conductive layer 575, through the dielectric layer 578, to the bottom conductive layer 576. Coating layers 579 and 589 are applied to the surfaces opposite to the surfaces that are coupled to the dielectric layer 578 on both the top and bottom conductive layers 575 and 576.

It should be noted that the present embodiments should not be limited to connecting the sensor elements of the rows using vias to the bottom conductive layer 576, but may include connecting the sensor elements of the columns using vias to the bottom conductive layer 576.

When pins are not being sensed (only one pin is sensed at a time), they are routed to ground. By surrounding the sensing device (e.g., touch-sensor pad) with a ground plane, the exterior elements have the same fringe capacitance to ground as the interior elements.

In one embodiment, an IC including the processing device 210 may be directly placed on the non-sensor side of the PCB. This placement does not necessary have to be in the center. The processing device IC is not required to have a specific set of dimensions for a touch-sensor pad, nor a certain number of pins. Alternatively, the IC may be placed somewhere external to the PCB.

Figure 6:
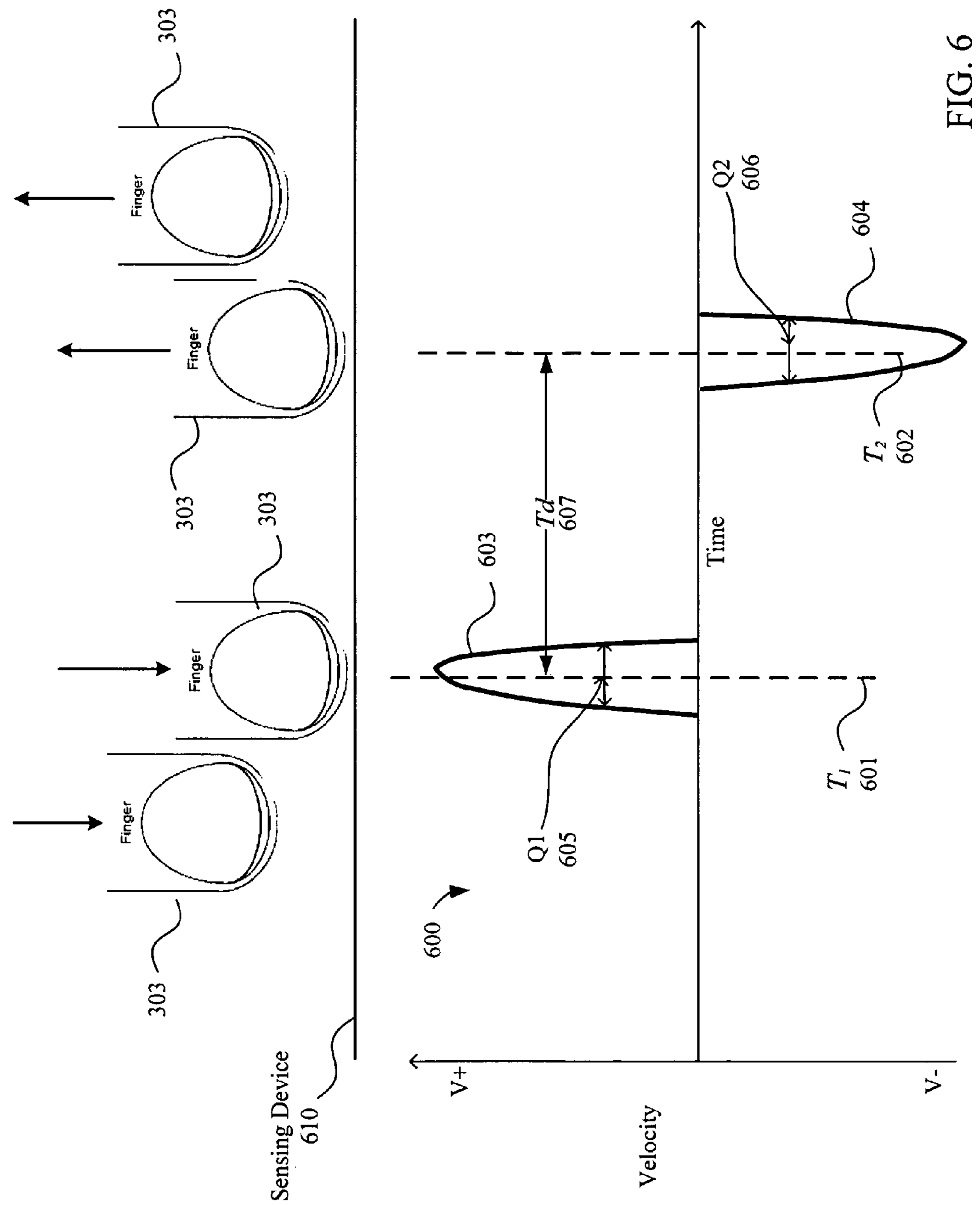
FIG. 6 illustrates a graph of one embodiment of a velocity of a presence of a finger on a sensing device

FIG. 6 illustrates a graph of one embodiment of a velocity of a presence of a finger on a sensing device. Graph 600 includes the velocity of a presence of a conductive object 303 (e.g., finger) on sensing device 610 as the conductive object 303 is substantially in contact with the sensing device 610 and when the conductive object 303 is not substantially in contact with the sensing device 610. As the conductive object 303-approaches the sensing device 610, the processing device 210 detects the presence of the conductive object 303. The processing device 210 determines the velocity of the presence of the conductive object 303 as the conductive object 303 becomes substantially in contact with the sensing device 610, as illustrated by a first peak 603 in the velocity at a first time 601. The processing device 210 determines the velocity of the presence of the conductive object 303 as the conductive object 303 becomes substantially not in contact with the sensing device 610, as illustrated by a second peak 604 in the velocity at a second time 602. Processing device 210 determines characteristics of each peak, such as height of the peak, width of the peak, and time 601 of the peak. Using the height and width of the peak, a sharpness factor is determined. The first peak 603 has a sharpness factor (Q1) 605, and the second peak 604 has a sharpness factor (Q2) 606. The sharpness factors Q1 and Q2 are compared against a sharpness threshold to determine if a peak is detected. For example, if Q1 is greater than the sharpness threshold, then the first peak 603 is detected as the velocity of the conductive object 303 in a positive direction (e.g., towards the sensing device 610), meaning the processing device 210 has detected the presence of the conductive object 303 as it becomes in substantial contact with the sensing device 610. Similarly, the processing device 210 detects the second peak 604 as the velocity of the conductive object 303 in a negative direction (e.g., away from the sensing device 610). Once the processing device 210 has detected the first and second peaks 603 and 604, the processing device 210 determines the time difference $T_d$ 607 between the first time 601 and the second time 602. The processing device 210 recognizes a tap gesture based on the determined velocity. In particular, the tap gesture is recognized when the time difference between the first time 601 and the second time 602 is less than a time threshold. The time threshold may be a preset static value, or alternatively, may be programmed by the user. Sensing device 610 may be a touch-sensor pad, a touch-sensor slider, or a touch-sensor button.

Figure 7A:
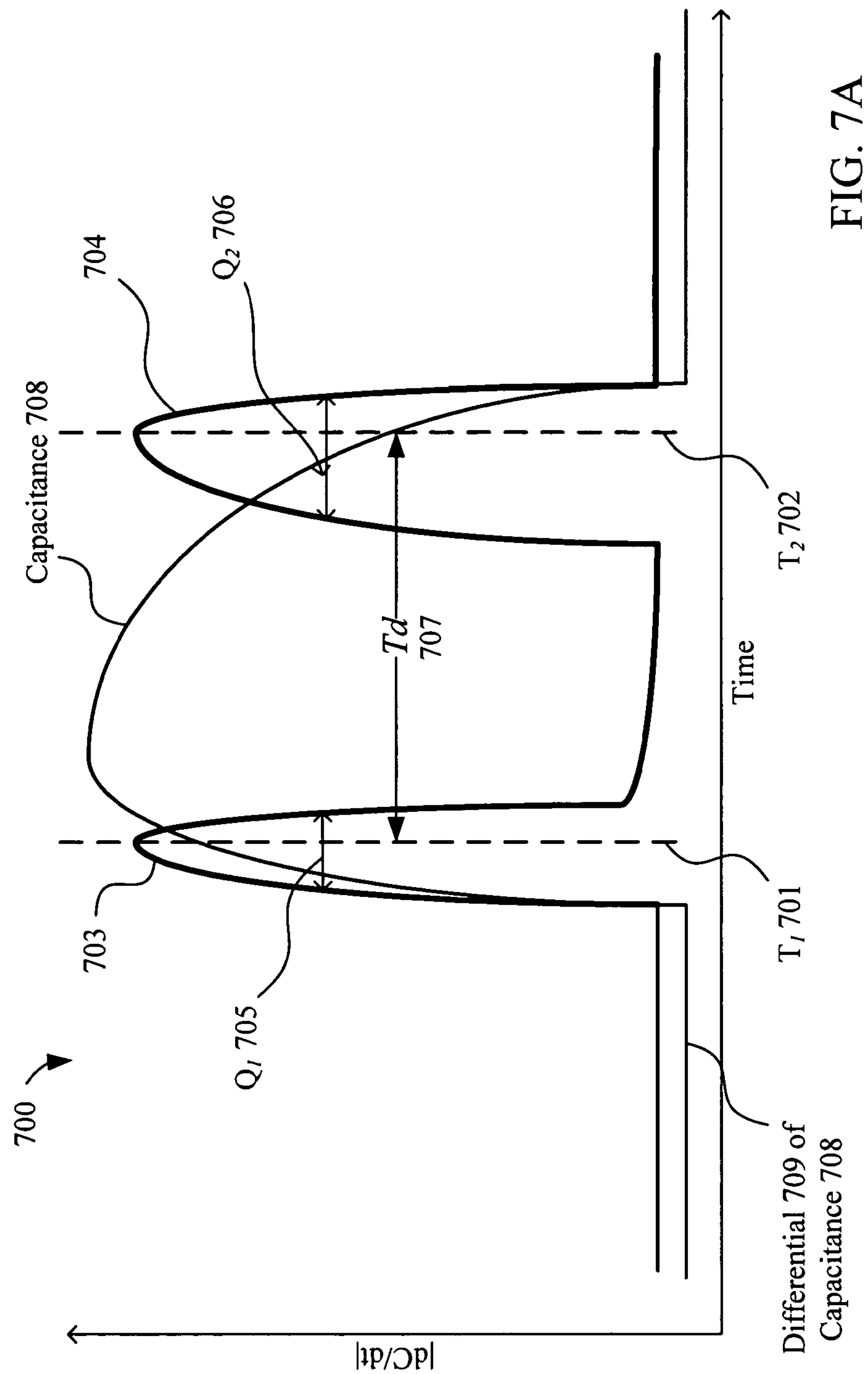
FIG. 7A illustrates a graph of one embodiment of a differential of the capacitance over time on a sensing device.

FIG. 7A illustrates a graph of one embodiment of a differential of the capacitance over time on a sensing device. Graph 700 includes the capacitance 708 of a conductive object 303 (e.g., finger) on sensing device 610 as the conductive object 303 is substantially in contact with the sensing device 610 and when the conductive object 303 is not substantially in contact with the sensing device 610. As the conductive object 303 approaches the sensing device 610, the processing device 210 detects the presence of the conductive object 303 by determining the capacitance 708 of the conductive object 303. Although the graph is representative of the differential of the capacitance over time, for illustration and description purpose, the capacitance 708 has been illustrated along with the differential 709 of the capacitance 708. The processing device 210 determines the differential 709 of the capacitance 708 over time. The differential 709 is representative of the velocity of the presence of the conductive object 303 as the conductive object 303 becomes substantially in contact with the sensing device 610, as illustrated by a first peak 703 in capacitance 708 at a first time 701. The processing device 210 determines the velocity of the presence of the conductive object 303 as the conductive object 303 becomes substantially not in contact with the sensing device 610, as illustrated by a second peak 704 in capacitance 708 at a second time 702. The first peak 701 is representative of a rising edge of the capacitance 708 in a positive direction, and the second peak 702 is representative of a falling edge of the capacitance 708 in a negative direction.

Processing device 210 determines characteristics of each peak, such as height of the peak, width of the peak, and time 601 of the peak. Using the height and width of the peak, a sharpness factor is determined. The first peak 703 has a sharpness factor (Q1) 705, and the second peak 704 has a sharpness factor (Q2) 706. The sharpness factors Q1 and Q2 are compared against a sharpness threshold to determine if a peak is detected. For example, if Q1 is greater than the sharpness threshold, then the first peak 703 is detected as the differential 709 of the conductive object 303 in a positive direction (e.g., towards the sensing device 610), meaning the processing device 210 has detected the presence of the conductive object 303 as it becomes in substantial contact with the sensing device 610. Similarly, the processing device 210 detects the second peak 704 as the differential 709 of the conductive object 303 in a negative direction (e.g., away from the sensing device 610).

Once the processing device 210 has detected the first and second peaks 703 and 704, the processing device 210 determines the time difference $T_d$ 707 between the first time 701 and the second time 702. The processing device 210 recognizes a tap gesture based on the determined differential 709. In particular, the tap gesture is recognized when the time difference between the first time 701 and the second time 702 is less than a time threshold. The time threshold may be a preset static value, or alternatively, may be programmed by the user.

Each sensor element outputs its own capacitance, however, when the conductive object 303 touches the sensing device 610, for example, a touch-sensor pad, some of the sensor element's capacitance increases, while other's capacitance do not increase. In one embodiment to determine the capacitance 708, processing device 210-determines a capacitance of each of the sensor elements of the sensing device 610, and determines an average capacitance based on the capacitance of each of the sensor elements. In another embodiment to determine the capacitance 708, processing device 210 determines a capacitance of each of the sensor elements of the sensing device 610, and determines which sensor element has the largest difference in capacitance to determine the capacitance 708. For both embodiments, once the capacitance is determined, processing device 210 determines the differential 709 of the capacitance 708 to recognize whether or not a tap gesture has occurred. Alternatively, other methods known by those of ordinary skill in the art may be used to determine the capacitance 708.

In one exemplary embodiment, the processing device 210 records the capacitance of each sensor element in a scan loop. After finishing the scan loop, the processing device 210 calculates the differential of the sensor's capacitance. The processing device 210 selects the sensor element, which has the biggest differential, and calculates its sharpness factor (Q), including its height and width of the peak, and the time of each peak. The processing device 210 recognizes the tap gesture if the sharpness factors of the two peaks are greater than the threshold sharpness factor, and if the time difference between the two peaks is less than the time threshold.

In another exemplary embodiment, the processing device 210 records the capacitance of each sensor element in a scan loop. After finishing the scan loop, processing device 210 adds up the capacitance of all of the sensor elements. After the processing device 210 sums the capacitance, it determines the differential of the summed capacitance, and calculates its sharpness factor (Q), including its height and width of the peak, and the time of each peak. The processing device 210 recognizes the tap gesture if the sharpness factors of the two peaks are greater than the threshold sharpness factor, and if the time difference between the two peaks is less than the time threshold. Because the conductive object is substantially in contact with the sensing device, wherever the presence of the conductive object is detected, the summation of the capacitance of all the sensor elements vary, in almost, if not exactly, the same manner as that of the single contacting point (e.g., the selected sensor element having the biggest difference). One advantage of this embodiment may include reducing processing time needed to determine the capacitance, and the differential of the capacitance.

It should be noted that embodiments described herein determine the rising and falling edges of the capacitance of the sensing device, unlike the conventional sensing devices, which determine the time between two cross-points at a threshold level. As previously described, the differential of the capacitance over time naturally captures the rising and falling edges of the capacitance, which represents the velocity of the presence of the conductive object. The rising and falling edges of the capacitance also represent the on- and off-actions of the tap gesture. The peaks in the differential yield more information about the velocity of the presence, such as the sharpness of the peak. For example, a fast touch results in a sharper peak, than a slower touch action. By using the sharpness of the peaks in the differential, the processing device 210 is operable to distinguish between tap gestures and other non-tap gestures, such as slow touching.

Figure 7B:
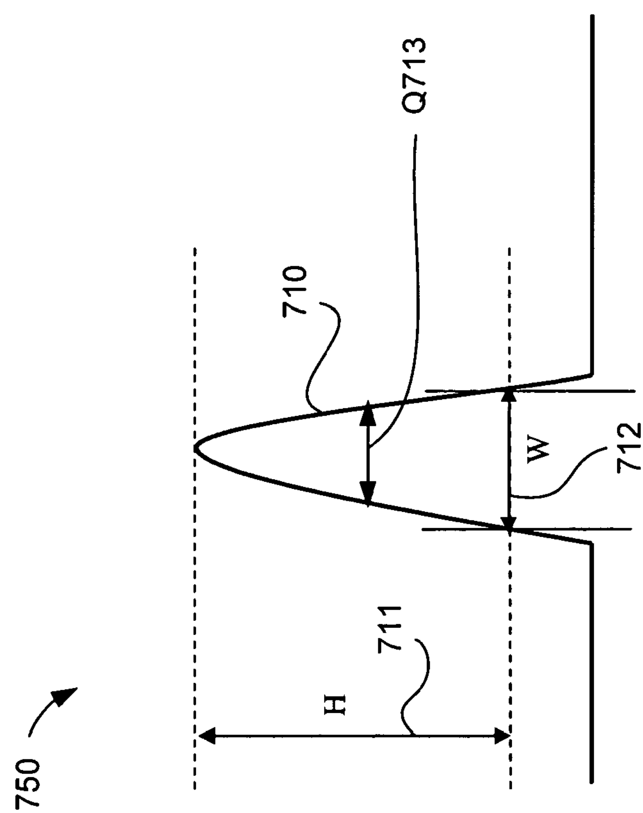
FIG. 7B illustrates a graph of one embodiment of a peak in the differential of the capacitance on the sensing device.

FIG. 7B illustrates a graph of one embodiment of a peak in the differential of the capacitance on the sensing device. As previously described the processing device 210 determines characteristics of each peak, such as height of the peak, width of the peak, and time of the peak. Graph 750 includes a peak 710 of the differential capacitance of the capacitance determined on the sensing device 610 (e.g., either on one sensor element or on all the sensor elements, as previously described). Processing device 210 determines a sharpness factor (Q) 713 using the height 711 and the width 712 of the peak 710.

In one embodiment, the sharpness factor (Q) 713 is determined by dividing the height 711 by the width 712. Alternatively, other methods known by those of ordinary skill in the art may be used to determine the sharpness factor (Q) 713. The height 711 may be determined by determining the maximum height of the peak 710. Alternatively, other methods known by those of ordinary skill in the art may be used to determine the height 711 of the peak 710. The width 712 may be determined by determining the midpoint height of the peak 710, and at that point determining the time difference between the two cross-points at that determined midpoint height. Alternatively, other methods known by those of ordinary skill in the art may be used to determine the width 712 of the peak 710.

It should be noted that the operations of processing device 210, described with respect to FIGS. 6, 7A, and 7B, may also be performed by a processing device of the host 250 (e.g., host processor), drivers of the host 250, the embedded controller 260, or by hardware, software, and/or firmware of other processing devices. For example, raw data from the sensing device may be sent to a processor, and the processor is configured to determine the velocity of the presence of the conductive object 303, to determine characteristics of each peak, such as height of the peak, width of the peak, and time of the peak. Similarly, the processor may be configured to determine the capacitance on the sensing device, determine the differential of the capacitance, detect first and second peaks in the differential, determine the time difference between the two peaks, and/or recognize a tap gesture based on the data sent from the sensing device.

Figure 8A:
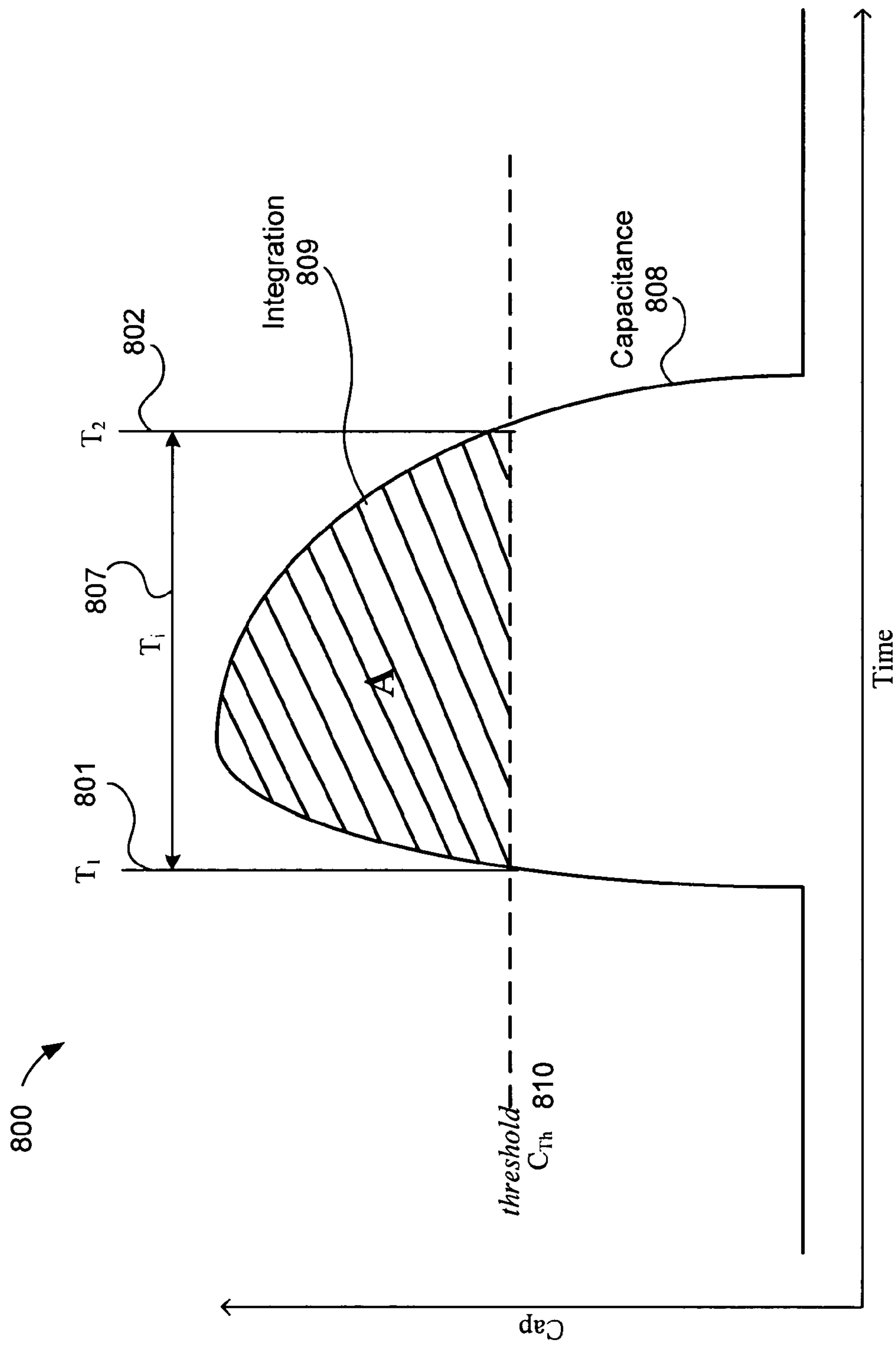
FIG. 8A illustrates a graph of one embodiment of an integration of the capacitance over time on a sensing device.

FIG. 8A illustrates a graph of one embodiment of an integration of the capacitance over time on a sensing device. Graph 800 includes the capacitance 808 of a conductive object 303 (e.g., finger) on sensing device 610 as the conductive object 303 is substantially in contact with the sensing device 610 and when the conductive object 303 is not substantially in contact with the sensing device 610. As the conductive object 303 approaches the sensing device 610, the processing device 210 detects the presence of the conductive object 303 by determining the capacitance 808 of the conductive object 303. The processing device 210 determines the integration 809 of the capacitance 808 between two points in time. In particular, the integration 809 is the integration of capacitance 808 between the two cross-points at a first time 801 and a second time 802, at which the capacitance crosses the threshold value $C_{Th}$ 810. Processing device 210 may also calculate the time difference $T_i$ 807 between the first and second times 801 and 802 of the two cross-points. By integrating the capacitance 808, the processing device 210 determines integration 809. Integration 809 is representative of the area under the curve of the capacitance 808 and above the threshold capacitance $C_{Th}$ 810. The processing device 210 recognizes a tap gesture based on the determined integration 809. In particular, the tap gesture is recognized when the integration 809 (e.g., area A) is above an area threshold. The area threshold may be a preset static value, or alternatively, may be programmed by the user. This embodiment may have the disadvantage of losing too much timing information. This may result in incorrectly recognizing a tap gesture in certain situations, For example, the capacitance may slightly cross the threshold capacitance $C_{Th}$ 810, but do so for a long enough time to make the area larger than the area threshold, incorrectly resulting in recognition of a tap gesture. This example is illustrated in FIG. 8B.

Figure 8B:
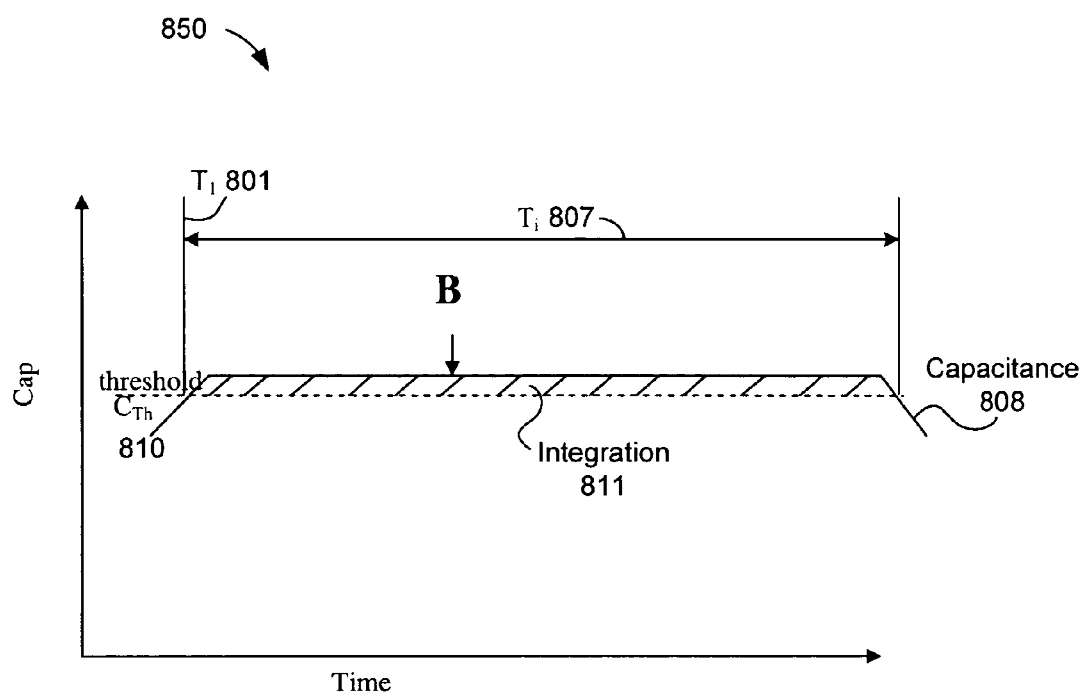
FIG. 8B illustrates a graph of another embodiment of an integration of the capacitance over time on a sensing device.

FIG. 8B illustrates a graph of another embodiment of an integration of the capacitance over time on a sensing device. Graph 850 includes the capacitance 808 of a conductive object 303 (e.g., finger) on sensing device 610 as the conductive object 303 is substantially in contact with the sensing device 610 and when the conductive object 303 is not substantially in contact with the sensing device 610. Like the example of FIG. 8A, the processing device 210 determines the integration 811 of the capacitance 808 between two points in time. In particular, the integration 811 is the integration of capacitance 808 between the two cross-points at a first time 801 and a second time 802, at which the capacitance crosses the threshold value $C_{Th}$ 810. Processing device 210 may also calculate the time difference $T_i$ 807 between the first and second times 801 and 802 of the two cross-points. By integrating the capacitance 808, the processing device 210 determines integration 809. Integration 809 is representative of the area under the curve of the capacitance 808 and above the threshold capacitance $C_{Th}$ 810. The processing device 210 recognizes a tap gesture based on the determined integration 811. In particular, the tap gesture is recognized when the integration 811 (e.g., area B) is above an area or integration threshold. The area threshold may be a preset static value, or alternatively, may be programmed by the user. As previously described, this embodiment may have the disadvantage of losing too much timing information, and result in incorrectly recognizing a tap gesture.

In another embodiment, processing device 210, in addition to determining the integration 809 and comparing the integration 809 to the area threshold, determines the time difference $T_i$ 807 between the two cross-points at the first and second times 801 and 802. The processing device 210 recognizes a tap gesture based on the determined integration 809 and the time difference $T_i$ 807. In particular, the tap gesture is recognized when the integration 809 (e.g., area A) is above an area threshold and the time difference $T_i$ 807 is less than a time threshold. Using both these conditions, the processing device 210 does not incorrectly recognize a tap gesture in the example illustrated in FIG. 8B, because the time difference $T_i$ 807 is greater than the time threshold; even though the integration 808 (e.g., area B) is greater than the area threshold. Like the embodiments of determining the differential, the embodiments of determining the integration may include determining the integration based on the capacitance of the selected sensor element, or the average capacitance of all the sensor elements.

It should be noted that the operations of processing device 210 described with respect to FIGS. 8A and 8B, may also be performed by a processing device of the host 250 (e.g., host processor), drivers of the host 250, the embedded controller 260, or by other processing devices, as described above with respect to FIGS. 6, 7A and 7B.

Figure 9A:
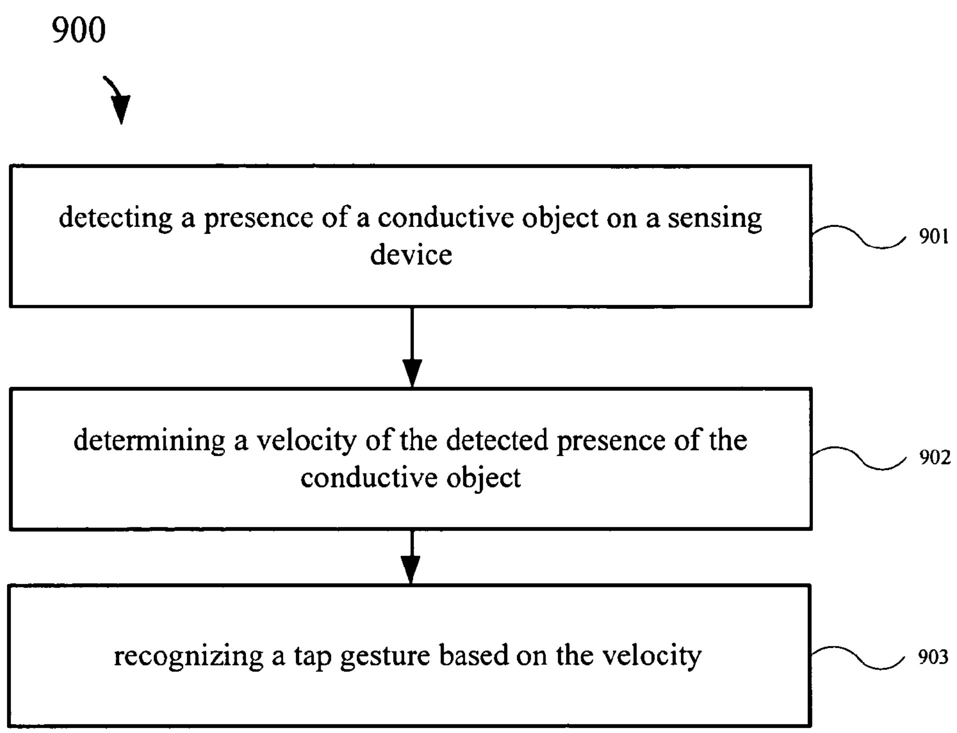
FIG. 9A illustrates a flowchart of one embodiment of a method for recognizing a tap gesture on a sensing device.

FIG. 9A illustrates a flowchart of one embodiment of a method for recognizing a tap gesture on a sensing device. Method 900 includes, first, detecting a presence of a conductive object on a sensing device, operation 901; second, determining a velocity of the detected presence of the conductive object, operation 902, and third, recognizing a tap gesture based on the velocity, operation 903. Determining a velocity of the detected presence of operation 902 may include determining a capacitance of the conductive object on the sensing device over time, and determining a differential of the capacitance over the time. The differential is representative of the velocity of the presence of the conductive object. Recognizing the tap gesture of operation 903 includes recognizing the tap gesture based on the differential. In particular, two peaks of the differential may be detected, and the time between the two peaks may be determined in order to recognize a tap gesture.

Figure 9B:
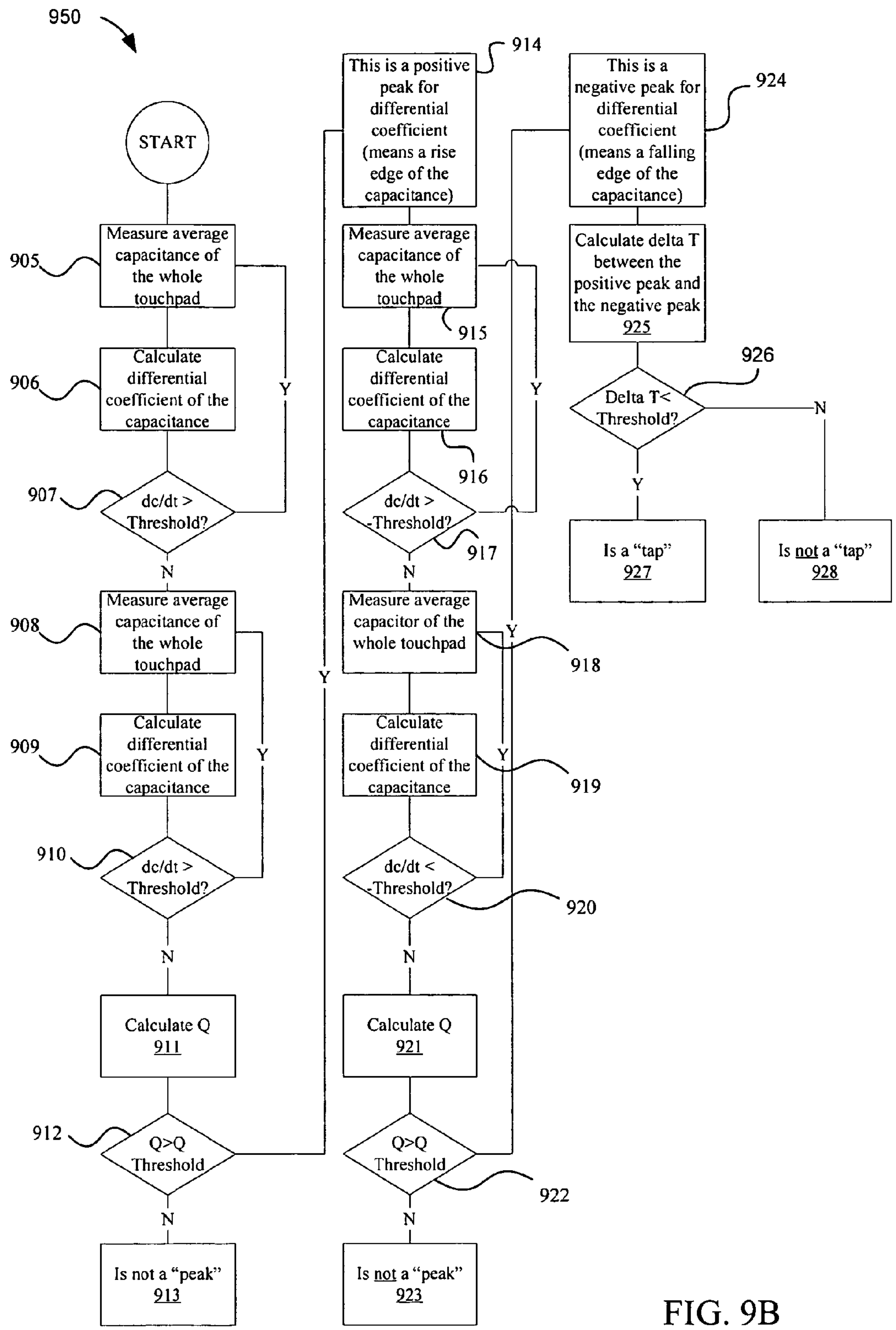
FIG. 9B illustrates a flowchart of another exemplary embodiment of a method for recognizing a tap gesture on a sensing device.

FIG. 9B illustrates a flowchart of another exemplary embodiment of a method for recognizing a tap gesture on a sensing device 610. Method 950 includes measuring an average capacitance of the whole sensing device 610 (e.g., touchpad), operation 905. This is performed using the capacitance sensor 201 and the sensing device 610. Next, the processing device 210 calculates the differential coefficient of the capacitance, operation 906. Next, the processing device 210 determines if the differential coefficient is less than a positive threshold, operation 907. If the differential coefficient is less than the positive threshold, the method goes back to repeat operations 905-907. If the differential coefficient is greater than the positive threshold, the method goes to operation 908-910, which includes measuring the average capacitance of the whole sensing device 610 (operation 908), calculating the differential coefficient of the capacitance (operation 909), and determining whether the differential coefficient is greater than the positive threshold (operation 910). If the differential coefficient is greater than the positive threshold, the method goes back to operation 908 and repeats operations 908-910. When the differential coefficient is less than the positive threshold, the method goes to operation 911, which includes calculating the sharpness factor (Q). This is performed by the processing core 202 of the processing device 210. The processing device 210 then determines whether the sharpness factor (Q) is greater than the sharpness factor threshold (Q Threshold), operation 912. If the sharpness factor (Q) is less than the sharpness factor threshold, then the determined differential is not a detected peak, operation 913. However, if the processing device 210 determines that the sharpness factor (Q) is greater than the sharpness factor threshold (Q Threshold) in operation 912, a positive peak for the differential is detected, operation 914. Detecting a positive peak indicates that a rising edge of the capacitance was detected by the processing device 210.

Next, the method includes measuring the average capacitance of the whole sensing device 610, operation 915. This is performed using the capacitance sensor 201 and the sensing device 610. Next, the processing device 210 calculates the differential coefficient of the capacitance, operation 916. Next, the processing device 210 determines if the differential coefficient is greater than a negative threshold, operation 917. If the differential coefficient is greater than the negative threshold, the method goes back to repeat operations 915-917. If the differential coefficient is less than the negative threshold, the method goes to operation 918-920, which includes measuring the average capacitance of the whole sensing device 610 (operation 918), calculating the differential coefficient of the capacitance (operation 909), and determining whether the differential coefficient is less than the negative threshold (operation 920). If the differential coefficient is less than the negative threshold, the method goes back to operation 918 and repeats operations 918-920. When the differential coefficient is greater than the negative threshold, the method goes to operation 921, which includes calculating the sharpness factor (Q). This is performed by the processing core 202 of the processing device 210. The processing device 210 then determines whether the sharpness factor (Q) is greater than the sharpness factor threshold (Q Threshold), operation 922. If the sharpness factor (Q) is less than the sharpness factor threshold, then the determined differential is not a detected peak, operation 923. However, if the processing device 210 determines that the sharpness factor (Q) is greater than the sharpness factor threshold (Q Threshold) in operation 922, a negative peak for the differential is detected, operation 924. Detecting a negative peak indicates that a falling edge of the capacitance was detected by the processing device 210.

Next, the method includes calculating the time difference between the positive and negative peaks, operation 925. This may also be performed by the processing core 202 of the processing device 210. Next, the processing device 210 determines whether the time difference is less than a time threshold, operation 926. If the time difference is less than the time threshold, the processing device 210 recognizes a tap gesture, operation 927. If the time difference is greater than the time threshold, the processing device 210 does not recognize a tap gesture, operation 928.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:

determining a first velocity of a detected presence of a conductive object relative to movement of the conductive object in a direction towards a surface of the capacitive sensing device;

determining a second velocity of the detected presence relative to movement of the conductive object in a direction away from the surface of the capacitive sensing device;

detecting a first peak of the first velocity in the direction towards the surface at a first time;

detecting a second peak of the second velocity in the direction away from the surface at a second time; and recognizing a gesture based on a difference between the first time and the second time.

2. The method of claim 1, wherein the determining of the first and second velocity comprises:

determining a capacitance of the conductive object-through the capacitance sensing device; and determining a rate of change of the capacitance, wherein the rate of change is representative of the first and second velocity of the detected presence, and wherein the recognizing of the gesture based on the relative difference between the first time and the second time comprises recognizing the gesture based on the rate of change of the capacitance.

3. The method of claim 2, wherein determining the capacitance of the conductive object comprises:

determining a capacitance of each of a plurality of sensor elements of the capacitance sensing device; and determining the capacitance of the conductive object as an average capacitance of the capacitance of each of the plurality of sensor elements, wherein recognizing the gesture is based on the average capacitance.

4. The method of claim 2, wherein the recognizing of the gesture based on the rate of change of the capacitance comprises:

detecting a first peak of the rate of change at the first time;

detecting a second peak of the rate of change at the second time;

determining a difference between the first time and the second time; and recognizing the gesture based on the difference between the first time and the second time being less than a time threshold, wherein the gesture includes a tap gesture.

5. The method of claim 4, wherein the detecting of the first peak of the rate of change at the first time comprises detecting a rising edge of the capacitance in a positive direction, and wherein the detecting of the second peak of the rate of change at the second time comprises detecting a falling edge of the capacitance in a negative direction.

6. The method of claim 4, wherein the recognizing of the tap gesture based on the rate of change of the capacitance comprises:

comparing a sharpness factor of the first peak of the rate of change to a sharpness threshold; and comparing a sharpness factor of the second peak of the rate of change to the sharpness threshold, wherein the sharpness factor of the first peak of the rate of change is based on a height and a width of the first peak of the rate of change and the sharpness factor of the second peak of the rate of change is based on a height and a width of the second peak of the rate of change.

7. An apparatus comprising:

a sensing device having a plurality of capacitive sensor elements; and a processing device coupled to the sensing device, wherein the processing device is configured to:

detect a presence of a conductive object relative to the sensing device through one or more of the plurality of capacitive sensor elements;

determine a first velocity of the detected presence relative to movement in a direction towards a surface of the sensing device;

determine a second velocity of the detected presence relative to movement in a direction away from the surface of the sensing device;

detect a first peak of the first velocity at a first time;

detect a second peak of the second velocity at a second time; and recognize a gesture based on a difference between the first time and the second time.

8. The apparatus of claim 7, wherein the processing device comprises a capacitance sensor coupled to the plurality of capacitive sensor elements, and wherein the capacitance sensor is configured to measure a capacitance of the conductive object through one or more of the plurality of capacitive sensor elements, wherein the processing device is configured to determine a rate of change of the capacitance and recognize the gesture based on the rate of change of the capacitance.

9. The apparatus of claim 8, wherein the capacitance sensor comprises a relaxation oscillator coupled to the plurality of capacitive sensor elements, wherein the relaxation oscillator comprises:

a current source to provide a charge current to the plurality of capacitive sensor elements; and a selection circuit coupled to the plurality of capacitive sensor elements and the current source, wherein the selection circuit is configured to sequentially select a capacitive sensor element of the plurality of capacitive sensor elements to provide the charge current and to measure the capacitance of each capacitive sensor element of the sensing device.

10. The apparatus of claim 9, wherein the processing device is configured to determine the capacitance of the conductive object based on an average capacitance of the one or more of the plurality of capacitive sensor elements.

11. The apparatus of claim 8, wherein the processing device is configured to:

detect a first peak of the rate of change at the first time;

detect a second peak of the rate of change at the second time;

determine a difference between the first time and the second time; and recognize the gesture based on the difference between the first time and the second time being less that than a time threshold, wherein the gesture includes a tap gesture.

12. The apparatus of claim 11, wherein the processing device is configured to detect a rising edge of the capacitance to detect the first peak of the rate of change at the first time and to detect a falling edge of the capacitance to detect the second peak of the rate of change at the second time.

13. The apparatus of claim 11, wherein the processing device is configured to:

determine a sharpness factor of the first peak of the rate of change based on a height and width of the first peak of the rate of change; and determine a sharpness factor of the second peak of the rate of change based on height and width of the second peak of the rate of change, wherein the processing device is configured to recognize the tap gesture based on a comparison between the sharpness factor of the first peak of the rate of change being and a sharpness threshold and a comparison between the sharpness factor of the second peak of the rate of change and the sharpness threshold.

14. The apparatus of claim 13, wherein the processing device is configured to distinguish between the tap gesture and a non-tap gesture based on the sharpness factor of the first peak of the rate of change and the sharpness factor of the second peak of the rate of change.

15. The apparatus of claim 13, wherein the sharpness factor of at least one of the first peak of the rate of change and the second peak of the rate of change is determined as the height of the at least one of the first peak of the rate of change and the second peak of the rate of change divided by the width of the at least one of the first peak of the rate of change and the second peak of the rate of change.

16. The apparatus of claim 11, wherein a height of the at least one of the first peak of the rate of change and the second peak of the rate of change is a maximum of the rate of change.

17. The apparatus of claim 7, wherein the conductive object is a finger.

18. The apparatus of claim 7, wherein the sensing device comprises a single-dimension sensor array comprising the plurality of sensor element.

19. The apparatus of claim 7, wherein the sensing device comprises a multi-dimension sensor array comprising the plurality of sensor elements.

20. The apparatus of claim 7, wherein the sensing device is a touch-sensor pad.

21. The apparatus of claim 7, wherein the sensing device is at least one of a touch-sensor pad or a touch sensor button.

22. The apparatus of claim 7, wherein the sensing device is mounted on a mobile handset.

23. A system comprising:

a touch input surface including a plurality of capacitive sensor elements;

a processing device coupled to the touch input surface, the processing device configured to detect a presence of an input object relative to the touch input surface through one or more of the plurality of capacitive sensor elements; determine a first velocity of a detected presence in a direction towards the touch input surface and determine a second velocity of the detected presence in a direction away from the touch input surface; detect a first peak of the first velocity at a first time; detect a second peak of the second velocity at a second time; and recognize a gesture based on a difference between the first time and the second time; and a host system coupled to the processing device, the host system configured use the recognized user gesture in an operation of the host system.

24. The system of claim 23, wherein the processing device is configured to measure a signal of the input object through the one or more of the plurality of sensor elements and determine a rate of change of the signal, wherein the rate of change of the signal reflects the first and second velocity of the detected presence.

25. The system of claim 24, wherein the processing device is configured to detect a first peak of the rate of change at the first time, detect a second peak of the rate of change at the second time, determine a difference between the first time and the second time, and recognize the user gesture based on a comparison between the determined difference and a time threshold, wherein the user gesture includes a tap gesture.

* * * * *